US012049773B2

(12) United States Patent
Carabalona

(10) Patent No.: US 12,049,773 B2
(45) Date of Patent: Jul. 30, 2024

(54) DOOR LATCH

(71) Applicant: Southco, Inc., Concordville, PA (US)

(72) Inventor: Eric Carabalona, Kenilworth (GB)

(73) Assignee: Southco, Inc., Concordville, PA (US)

( * ) Notice: Subject to any disclaimer, the term of this patent is extended or adjusted under 35 U.S.C. 154(b) by 741 days.

(21) Appl. No.: 16/955,433

(22) PCT Filed: Dec. 20, 2018

(86) PCT No.: PCT/US2018/066671
§ 371 (c)(1),
(2) Date: Jun. 18, 2020

(87) PCT Pub. No.: WO2019/126427
PCT Pub. Date: Jun. 27, 2019

(65) Prior Publication Data

US 2020/0392772 A1 Dec. 17, 2020

Related U.S. Application Data

(60) Provisional application No. 62/609,003, filed on Dec. 21, 2017.

(51) Int. Cl.
*E05C 9/04* (2006.01)
*E05B 13/10* (2006.01)
*E05B 83/30* (2014.01)

(52) U.S. Cl.
CPC .............. *E05C 9/041* (2013.01); *E05B 13/10* (2013.01); *E05B 83/30* (2013.01); *E05Y 2900/538* (2013.01)

(58) Field of Classification Search
CPC ... E05C 9/041; E05C 9/04; E05C 9/12; E05C 1/145; E05B 13/10; E05B 83/30;
(Continued)

(56) References Cited

U.S. PATENT DOCUMENTS 1,964,066 A * 6/1934 Kuszmaul ............... E05B 85/22 292/172
4,052,092 A * 10/1977 Bergen ...................... E05C 1/14 70/462

(Continued)

FOREIGN PATENT DOCUMENTS

| | | | |
|---|---|---|---|
| CN | 206000313 | U | 3/2017 |
| JP | 2013023159 | A | 2/2013 |
| WO | 2015163282 | A1 | 10/2015 |

OTHER PUBLICATIONS

Indian Examination Report for Indian Application No. 202017026612, dated Mar. 30, 2022, with translation, 6 pages.

(Continued)

*Primary Examiner* — Christine M Mills
*Assistant Examiner* — Faria F Ahmad
(74) *Attorney, Agent, or Firm* — Buchanan Ingersoll & Rooney PC

(57) ABSTRACT

A latch assembly having a base and a paddle. The paddle is rotatably connected to the base to pivot about a paddle axis and has a drive surface offset from the paddle axis. A catch pinion is rotatably connected to the base to rotate about a pinion axis that is generally perpendicular to the paddle axis. The catch pinion has an activation surface positioned such that movement of the drive surface generates a force on the activation surface to rotate the catch pinion about the pinion axis. The catch pinion may have a concave surface to receive a portion of the drive surface as the paddle rotates. A lock may be movably mounted to the paddle, and movable to engage a lock surface on the catch pinion to prevent the paddle from rotating. A lock may be provided to selectively disable the drive surface from rotating with the paddle.

16 Claims, 20 Drawing Sheets

(58) Field of Classification Search
CPC .... E05B 83/28; E05B 83/32; Y10T 292/0837; Y10T 292/0839; Y10T 292/084; Y10T 292/0977
See application file for complete search history.

(56) References Cited

U.S. PATENT DOCUMENTS

| | | | | | |
|---|---|---|---|---|---|
| 4,620,733 | A * | 11/1986 | Gaunt | E05C 9/06 | 70/120 |
| 7,451,628 | B1 * | 11/2008 | Kim | E05B 83/30 | 70/159 |
| 8,141,398 | B2 * | 3/2012 | Ookawara | E05C 1/145 | 292/109 |
| 8,590,351 | B2 | 11/2013 | Ookawara et al. | | |
| 10,214,946 | B2 * | 2/2019 | Fukumoto | E05C 1/12 | |
| 10,400,486 | B2 * | 9/2019 | Nakasone | E05B 83/30 | |
| 10,435,921 | B2 | 10/2019 | Nakasone | | |
| 10,480,223 | B2 * | 11/2019 | Nakasone | E05C 9/042 | |
| 11,359,420 | B2 * | 6/2022 | Singh | E05B 13/101 | |
| 11,454,054 | B2 * | 9/2022 | Kondo | E05C 9/02 | |
| 11,492,824 | B2 * | 11/2022 | Flaute | B60R 7/06 | |
| 2005/0104380 | A1 * | 5/2005 | Cho | E05B 83/30 | 292/33 |
| 2006/0267364 | A1 * | 11/2006 | Katagiri | E05B 83/30 | 296/37.12 |
| 2007/0080542 | A1 | 4/2007 | Ookawara | | |
| 2007/0163310 | A1 * | 7/2007 | Ookawara | E05C 1/145 | 70/208 |
| 2007/0289345 | A1 * | 12/2007 | Kozuka | E05B 83/30 | 70/237 |
| 2014/0150505 | A1 | 6/2014 | Shimizu | | |
| 2014/0152026 | A1 * | 6/2014 | Cinco | E05B 83/28 | 292/139 |
| 2015/0008680 | A1 * | 1/2015 | Suzuki | E05B 83/30 | 292/32 |
| 2018/0347241 | A1 * | 12/2018 | Nakasone | E05C 9/04 | |
| 2019/0218834 | A1 * | 7/2019 | Komatsu | E05B 77/44 | |
| 2020/0408010 | A1 * | 12/2020 | Takai | E05B 83/30 | |
| 2021/0140204 | A1 * | 5/2021 | Minnich | E05B 83/30 | |

OTHER PUBLICATIONS

International Search Report and Written Opinion for International Application No. PCT/US2018/066671, dated May 31, 2019, 16 pages.

Chinese Office Action with Search Report for Chinese Application No. 201880090094.2, dated Mar. 25, 2021, 5 pages.

International Preliminary Report on Patentability and Written Opinion for International Application No. PCT/US2018/066671, issued Jun. 23, 2020, 13 pages.

* cited by examiner

Fig. 7A
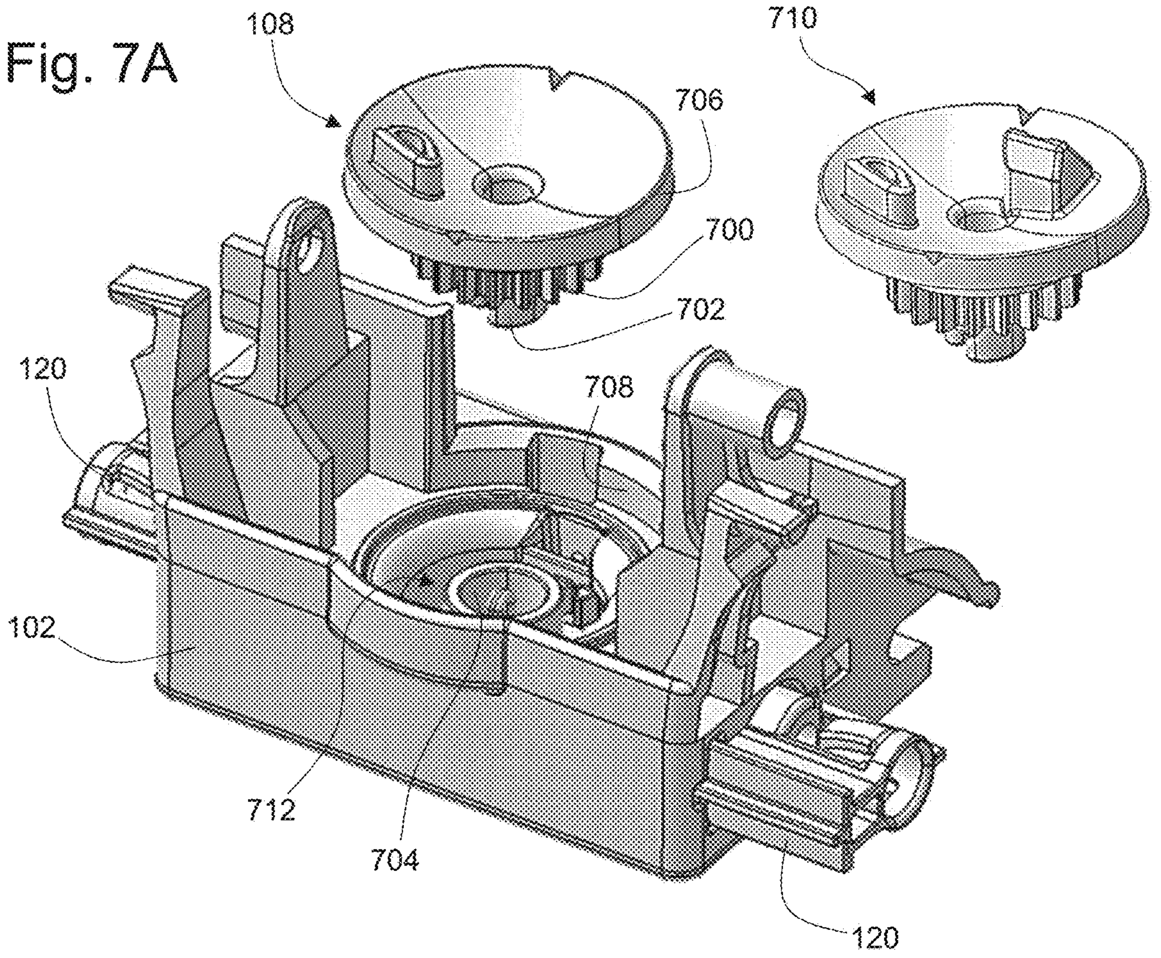
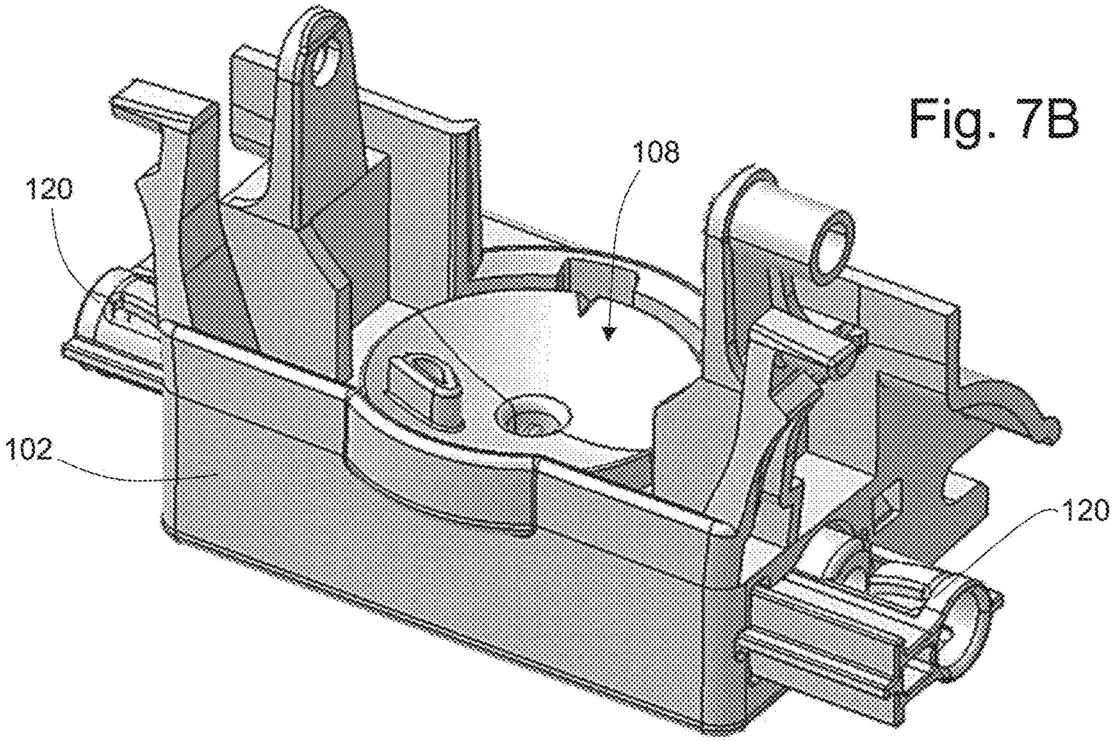
Fig. 7B

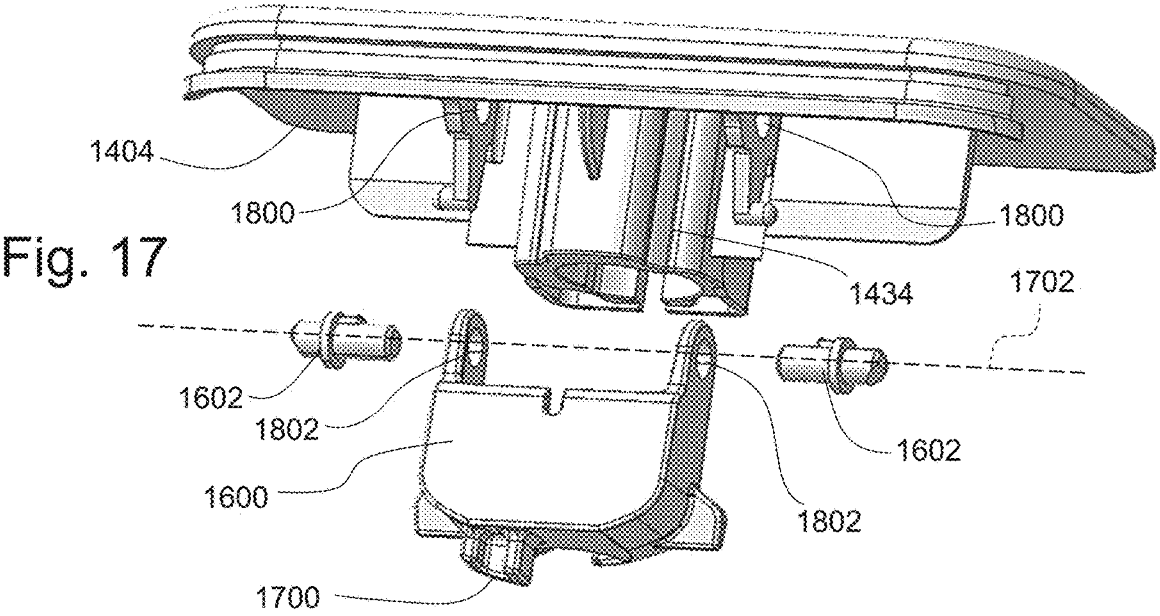
Fig. 17
Fig. 18A
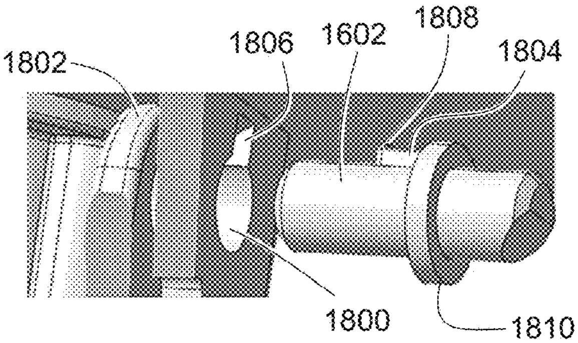
Fig. 18B
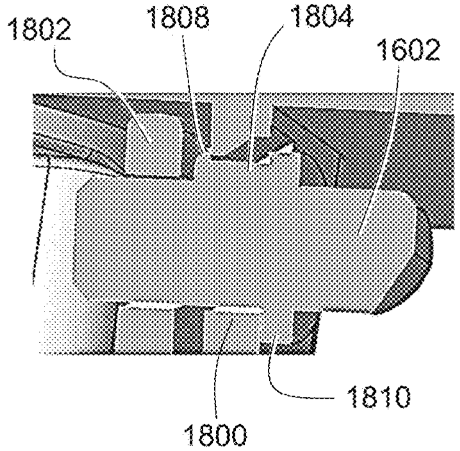
Fig. 19
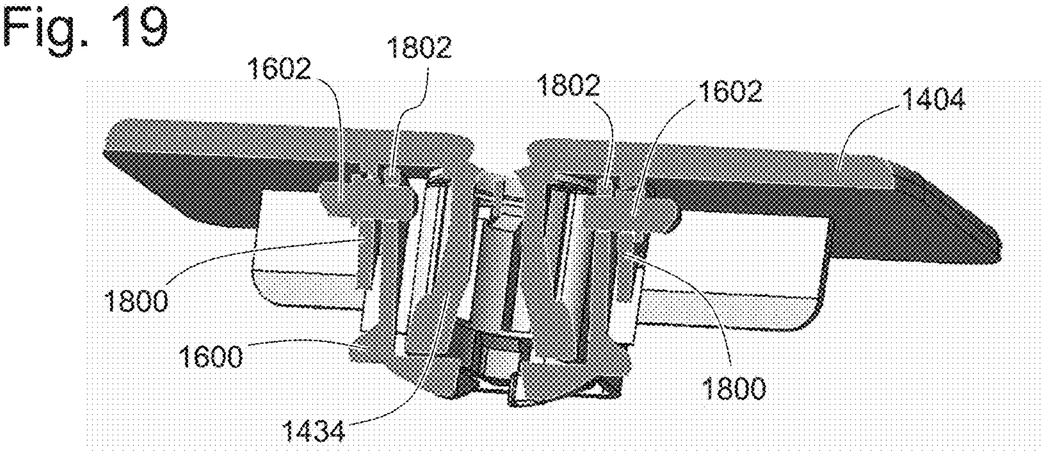

DOOR LATCH

This application is a U.S. National Phase of PCT International Application No. PCT/US2018/066671, filed on 20 Dec. 2018, which claims the benefit of U.S. Provisional Application No. 62/609,003, filed on 21 Dec. 2017, both of which are incorporated by reference herein.

FIELD OF THE INVENTION

The present invention relates to the field of latches or connector systems configured to provide a mechanical connection between adjacent components, and particularly to latch systems for securing automotive glove box or accessory compartment doors in the closed position.

BACKGROUND OF THE INVENTION

Automotive closure systems, such as glove boxes and the like, typically include a housing, a door, and a latch that cooperates with one or more strikers to hold the door in the closed position to cover the housing.

Such closure systems typically are manufactured by multiple different entities. These entities can have different manufacturing processes, and different manufacturing tolerance thresholds. For example, a company making a door or molded plastic may deal with significantly different issues than another company making a latch assembly. It is important, but sometimes difficult, for such companies to cooperate to provide parts that assemble together with tight tolerances and high final product quality.

Automotive closure systems also may be provided in different model configurations, which can vary by automobile manufacturer, automobile model, and automobile trim or accessory level. For example, a particular automobile may be provided in a convertible model or a high-end model in which it may be desirable to have a lock on the closure system, as well as a low-end or non-convertible model in which a closure lock is not provided. Thus, it is desirable, but sometimes difficult, to provide a latch assembly that can meet the various different model or manufacturer requirements while still maintaining cost efficiency and general a uniformity of the latch assembly design.

It has been found that there is a continuing need to improve upon or provide alternatives to existing door closure systems.

SUMMARY OF THE INVENTION

According to a first embodiment of the present invention, there is provided a latch assembly having a base and a paddle. The paddle is rotatably connected to the base to pivot about a paddle axis, and the paddle has a drive surface located at a position offset from the paddle axis, the drive surface being movable, upon rotation of the paddle about the paddle axis, through a first travel path extending between a first drive surface position and a second drive surface position. A catch assembly having a catch pinion and activation surface is connected to the base. The catch pinion is rotatably connected to the base to rotate about a pinion axis that is generally perpendicular to the paddle axis, and the catch pinion has a pinion plate facing the paddle and having a concave recess to receive at least a portion of the drive surface when the drive surface moves between the first drive surface position and the second drive surface position. The activation surface extends from the pinion plate at a location offset from the pinion axis, and the activation surface is movable, upon rotation of the catch pinion about the pinion axis, through a second travel path extending between a first activation surface position adjacent the first drive surface position and a second activation surface position adjacent the second drive surface position. The second travel path intersects the first travel path such that the drive surface can contact at least a portion of the activation surface throughout the first travel path.

A paddle return spring may be connected between the base and the paddle and configured to generate a restoring force to move the paddle towards the first drive surface position.

The latch assembly may have at least one release member movably mounted to the base to move between a first release member position and a second release member position, wherein the catch pinion is operatively connected to the at least one release member to move the at least one release member from the first release member position to the second release member position upon rotation of the catch pinion from the first activation surface position to the second activation surface position. The latch assembly may further include a release member return spring connected between the base and the at least one release member and configured to generate a restoring force to move the at least on release member towards the first release member position. The release member return spring may be connected between the base and the catch pinion.

The base may include a chamber that receives at least a portion of the at least one release member, and the pinion plate is shaped as a cover to enclose a corresponding opening into the chamber. The catch pinion may be operatively connected to the at least one release member by a drive gear rotationally fixed to the catch pinion and a rack gear fixed to the at least one release member with the rack gear in meshing engagement with the drive gear, and the release member may be slidingly mounted to the base such that rotation of the drive gear causes linear movement of the at least one release member. The at least one release member may include a first release member slidingly mounted to the base to move along a first sliding axis and a second release member slidingly mounted to the base to move along a second sliding axis.

A drive pinion may be rotationally fixed to the catch pinion, and each of the first release member and the second release member may include a respective surface held in engagement with the drive pinion such that rotation of the drive pinion causes the first release member and the second release member to slide relative to the base. The drive pinion may include a gear, and the respective surfaces held in engagement with the drive pinion may be respective gear racks in meshing engagement with the drive gear. The first sliding axis may be parallel to the second sliding axis.

The at least one release member may include a catch rigidly fixed to the release member. When the at least one release member is in the first release member position, the catch extends a first distance outside the base, and when the at least one release member is in the second release member position, the catch extends a second distance outside the base, the second distance being less than the first distance, or the catch does not extend outside the base.

The at least one release member may include a catch receiver. A remote catch may be operatively connected to the catch receiver. The remote catch may be connected to the catch receiver by a ball and socket joint. The remote catch may be releasably connected to the catch receiver.

The latch assembly may include a lock movably mounted to the paddle and having a first lock surface that is selectively movable to a locking position at which the lock engages the catch pinion to prevent rotation of the catch pinion in at least one direction about the pinion axis. The pinion plate may have a second lock surface that is located at the locking position when the catch pinion is in the first activation surface position.

The activation surface may be a post extending from the catch plate. The activation surface and the drive surface may be shaped such that the drive surface contacts the activation surface at a first distance from the pinion axis when the catch pinion is in the first activation surface position, and the drive surface contacts the activation surface at a second distance from the pinion axis when the catch pinion is in the second activation surface position, the second distance being different from the first distance. The second distance may be less than the first distance.

In another exemplary aspect, there is provided a latch assembly having a base and a paddle. The paddle is rotatably connected to the base to pivot about a paddle axis, and the paddle has a drive surface located at a position offset from the paddle axis, the drive surface being movable through a first travel path when the paddle rotates about the paddle axis. A catch pinion is rotatably connected to the base to rotate about a pinion axis that is generally perpendicular to the paddle axis, the catch pinion including an activation surface positioned in the first travel path such that movement of the drive surface through the first travel path in at least one direction generates a force on the activation surface to rotate the catch pinion about the pinion axis. A lock is movably mounted to the paddle and includes a first lock surface that is selectively movable to a locking position at which the lock engages the catch pinion to prevent rotation of the catch pinion in at least one direction about the pinion axis.

The paddle may be rotatable about the paddle axis between a first paddle position and a second paddle position, and the first travel path may extend between a first drive surface position when the paddle is in the first paddle position and a second drive surface position when the paddle is in the second paddle position, and the lock may have a first lock surface movably mounted to the paddle and selectively movable, when the paddle is in the first paddle position, to a latch locking position located offset from the paddle axis. A paddle return spring may be connected between the base and the paddle and configured to generate a restoring force to move the paddle towards the first paddle position. The catch pinion may be rotatable about the pinion axis between a first pinion position and a second pinion position, and the activation surface may be at a first location offset from the pinion axis and is movable, upon rotation of the catch pinion from the first pinion position to the second pinion position, through a second travel path extending from a first activation surface position adjacent the first drive surface position to a second activation surface position adjacent the second drive surface position, wherein the second travel path intersects the first travel path such that the drive surface can contact at least a portion of the activation surface throughout the first travel path. A catch pinion return spring may be connected between the base and the catch pinion and configured to generate a restoring force to move the catch pinion towards a first pinion position.

The catch pinion may also include a second lock surface at a second location offset from the pinion axis, the second lock surface being movable, upon rotation of the catch pinion from the first pinion position to the second pinion position, through a third travel path extending from a first lock surface position to a second lock surface position, wherein the latch locking position is located along the third travel path and adjacent the first lock surface position, and the first lock surface and the second lock surface are configured to prevent rotation of the catch pinion to the second pinion position when the first lock surface is located in the latch locking position. The latch locking position may be offset from the first travel path in a direction parallel to the paddle axis, and the pinion axis may be located, with respect to the paddle axis, between the latch locking position and the first travel path.

The catch pinion may have a plate that faces the paddle, and the activation surface may extend from the plate, and the plate may have a concave recess to receive at least a portion of the drive surface when the drive surface moves through the first travel path.

The latch assembly may also have at least one release member movably mounted to the base to move between a first release member position and a second release member position, wherein the catch pinion is operatively connected to the at least one release member to move the at least one release member from the first release member position to the second release member position upon rotation of the catch pinion from a first pinion position to a second pinion position. The base may have a chamber that receives at least a portion of the at least one release member, the catch pinion passes through an opening into the chamber, and the catch pinion comprises a plate that closes the opening. The activation surface may be a post extending from the plate.

The paddle may be rotatable about the paddle axis between a first paddle position and a second paddle position, and the lock may include a first lock surface movably mounted to the paddle and selectively movable, when the paddle is in a first paddle position, to a latch locking position located offset from the paddle axis, and the catch pinion may include a second lock surface extending from the plate and configured to engage the first lock surface when the first lock surface is in the latch locking position to prevent rotation of the paddle to the second paddle position.

The catch pinion may include a drive gear, and the at least one release member may be slidingly mounted to the base and comprises a rack gear in meshing engagement with the drive gear, such that rotation of the drive gear causes linear movement of the at least one release member.

The at least one release member may include a first release member slidingly mounted to the base to move along a first sliding axis and a second release member slidingly mounted to the base to move along a second sliding axis. Each of the first release member and the second release member may include a respective surface held in engagement with the catch pinion such that rotation of the catch pinion causes the first release member and the second release member to slide relative to the base. The catch pinion may include a gear, and the respective surfaces held in engagement with the catch pinion may have respective gear racks in meshing engagement with the drive gear. The first sliding axis may be parallel to the second sliding axis.

The at least one release member may include a catch rigidly fixed to the release member, the catch being movable between a first position and a second position upon rotation of the catch pinion, with the first position at a first distance outside the base, and the second position is at a second distance outside the base that is less than the first distance, or at a location that is not outside the base.

The at least one release member may include a catch receiver. A remote catch may be operatively connected to the catch receiver.

In another exemplary aspect, there is provided a latch assembly having a base and a paddle. The paddle is rotatably connected to the base to pivot about a paddle axis between a first paddle position and a second paddle position. A drive surface is located at a position offset from the paddle axis, and the drive surface is reconfigurable between a first configuration in which the drive surface is not movable relative to the paddle, and a second configuration in which the drive surface is movable relative to the paddle. When the drive surface is in the first configuration, rotation of the paddle about the paddle axis from the first paddle position to the second paddle position forces the drive surface to move through a first travel path from a first drive surface position to a second drive surface position. When the drive surface is in the second configuration, rotation of the paddle about the paddle axis does not force the drive surface to move through the first travel path from the first drive surface position to the second drive surface position. A catch pinion is rotatably connected to the base to rotate about a pinion axis that is generally perpendicular to the paddle axis, the catch pinion including an activation surface positioned in the first travel path at a location offset from the pinion axis, such that movement of the drive surface through the first travel path from the first drive surface position to the second drive surface position generates a force on the activation surface to rotate the catch pinion about the pinion axis from a first activation surface position to a second activation surface position.

A paddle return spring may be connected between the base and the paddle and configured to generate a restoring force to move the paddle towards the first paddle position.

A catch pinion return spring may be connected between the catch pinion and the base and configured to generate a restoring force to bias the catch pinion towards the first activation surface position.

The drive surface may be attached to a lever that is rotatably connected to the paddle about a lever pivot axis, the lever pivot axis being parallel to the paddle axis. A first lock surface may be movably mounted to the paddle, the first lock surface being movable between an engaged position in which the first lock surface engages the lever to hold the drive surface in the first configuration, and a disengaged position in which the first lock surface does not engage the lever to hold the drive surface in the first configuration. The first lock surface may be rotatably connected to the paddle to rotate between the engaged position and the disengaged position. The lever may have a second lock surface located adjacent the first lock surface when the first lock surface is in the engaged position, and an opening located adjacent the first lock surface when the first lock surface is in the disengaged position.

The second travel path may intersect the first travel path such that the drive surface can contact at least a portion of the activation surface throughout the first travel path.

The catch pinion may include a plate that faces the paddle, the activation surface may extend from the plate, and the plate may have a concave recess to receive at least a portion of the drive surface when the drive surface moves through the first travel path.

The latch assembly also may have at least one release member movably mounted to the base to move between a first release member position and a second release member position, wherein the catch pinion is operatively connected to the at least one release member to move the at least one release member from the first release member position to the second release member position upon rotation of the catch pinion from a first pinion position to a second pinion position. The base may have a chamber that receives at least a portion of the at least one release member, the catch pinion may pass through an opening into the chamber, and the catch pinion may have a plate that closes the opening. The activation surface may include a post extending from the plate.

The catch pinion may include a drive gear, and the at least one release member may be slidingly mounted to the base and include a rack gear in meshing engagement with the drive gear, such that rotation of the drive gear causes linear movement of the at least one release member.

The at least one release member may include a first release member slidingly mounted to the base to move along a first sliding axis and a second release member slidingly mounted to the base to move along a second sliding axis. Each of the first release member and the second release member may have a respective surface held in engagement with the catch pinion such that rotation of the catch pinion causes the first release member and the second release member to slide relative to the base. The catch pinion may include a gear, and the respective surfaces held in engagement with the catch pinion may include respective gear racks in meshing engagement with the drive gear. The first sliding axis may be parallel to the second sliding axis.

The at least one release member may include a catch rigidly fixed to the release member, the catch being movable between a first position and a second position upon rotation of the catch pinion, the first position being a first distance outside the base, and the second position being a second distance outside the base that is less than the first distance, or at a location that is not outside the base.

The at least one release member may include a catch receiver. A remote catch may be operatively connected to the catch receiver.

BRIEF DESCRIPTION OF THE DRAWINGS

The above and other aspects and features of the present invention will become more apparent to those of ordinary skill in the art by describing in detail exemplary embodiments thereof with reference to the attached drawings.

FIGS. 7A and 7B are exploded and assembled views, respectively, of the latch base, release members and catch pinion of the embodiment of FIG. 1.

FIG. 17 is an exploded view of the paddle and lever assembly of FIG. 14.

FIGS. 18A and 18B are exploded and cutaway assembled views, respectively, of an exemplary pivot connection between the lever and paddle of FIG. 17.

FIG. 19 is a cutaway assembled view of the paddle and lever assembly of FIG. 14.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

Figure 1:
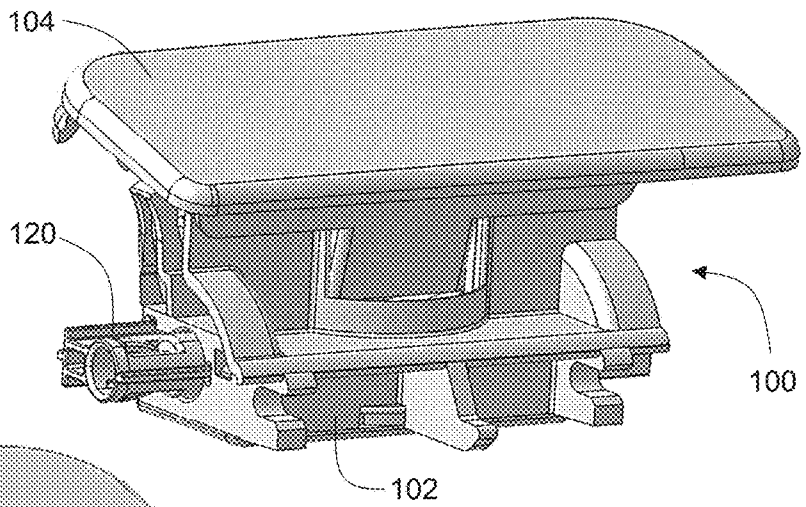
FIG. 1 is an isometric view of a first exemplary embodiment of a latch assembly.
Figure 2:
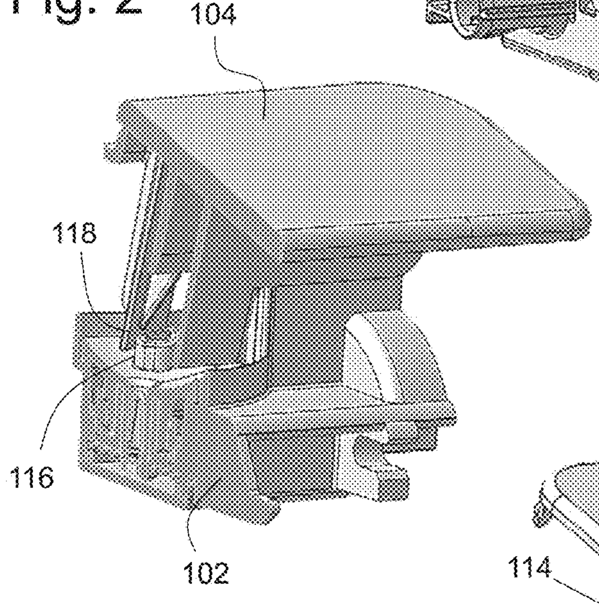
FIG. 2 is a cutaway view of the embodiment of FIG. 1.
Figure 3:
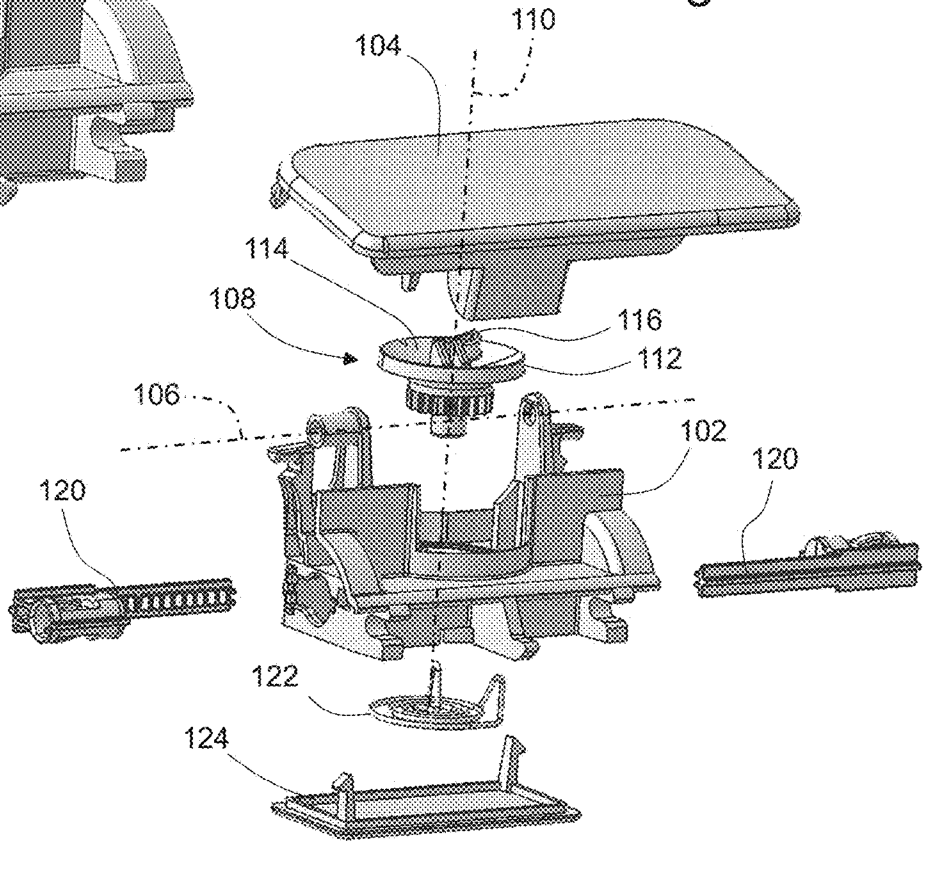
FIG. 3 is an exploded view of the embodiment of FIG. 1.

A first embodiment of a latch assembly 100 incorporating aspects of the present invention is illustrated in FIGS. 1 through 3. The latch assembly 100 includes a base 102 and a paddle 104 pivotally connected to the base 102 to rotate about a paddle axis 106. The paddle 104 is shaped to receive an operator's hand or finger to operate the latch assembly 100. The latch assembly 100 also includes a catch pinion 108 that is rotatably mounted to the base 102 to rotate about a pinion axis 110 that is generally perpendicular to the paddle axis 106. The pinion axis 110 may intersect the paddle axis 106, or it may lie within a plane that is generally perpendicular to the paddle axis 106. In the latter case, the pinion axis 110 may be oriented within the perpendicular plane at an angle that is within about 30 degrees, and more preferably within about 15 degrees, and more preferably within about 10 degrees, of an imaginary line extending from the catch pinion 108 to the paddle axis 106.

The catch pinion 108 may have a pinion plate 112 located at an end of the catch pinion 108 adjacent the paddle 104. The pinion plate 112 extends generally orthogonally from the pinion axis 110, and a surface 114 of the pinion plate 112 faces the paddle 104.

An activation surface 116 extends from the catch pinion 108 towards the paddle 104. The activation surface 116 may comprise, for example, a portion of a post that extends from the pinion plate surface 114. The activation surface 116 (or at least a portion thereof) is located at a position that is offset from the catch pinion axis 110. Thus a force applied to the activation surface 116 generates a moment that tends to rotate the catch pinion 108 about the pinion axis 110, assuming such force is not oriented along the pinion axis 110 and does not directly intersect the pinion axis 110.

A drive surface 118 extends from the paddle 104 towards the catch pinion 108. The drive surface 118 is located at a position that is offset from the paddle axis 106, such that the drive surface 118 travels through a movement path as the paddle 104 rotates about the paddle axis 106. The drive surface 118 is positioned such it can contact the activation surface 116 through at least a portion of the drive surface's travel path. This provides a means for converting the pivoting movement of the paddle 104 into a rotational movement of the catch pinion 108, as explained in more detail below.

The catch pinion 108 is operatively connected to one or more release members 120 that are movably connected to the base 102. The release members 120 are movable between a first position in which they (or extensions thereof) engage respective strikers (not shown) to prevent or inhibit movement of the latch assembly 100 relative to the striker, and a second position in which they do not engage the respective striker to allow movement of the latch assembly 100 relative to the striker. For example, the latch assembly 100 may be secured to a glove box door, such as described below, and the release members may selectively engage corresponding strikers in a dashboard assembly that surrounds the glove box door.

The latch assembly 100 also may include a paddle return spring (see FIG. 16), a pinion return spring 122, a dust cover 124, and other features. Examples of such features are described below.

Figure 4A:
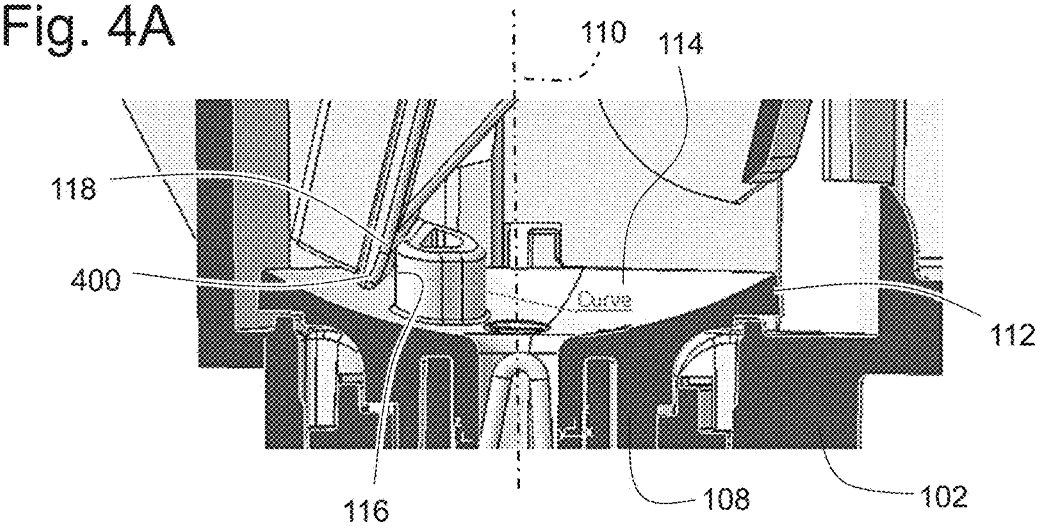
FIGS. 4A and 4B are partial side cutaway views of the embodiment of FIG. 1, showing the latch assembly in a latched and unlatched configuration, respectively.
Figure 4B:
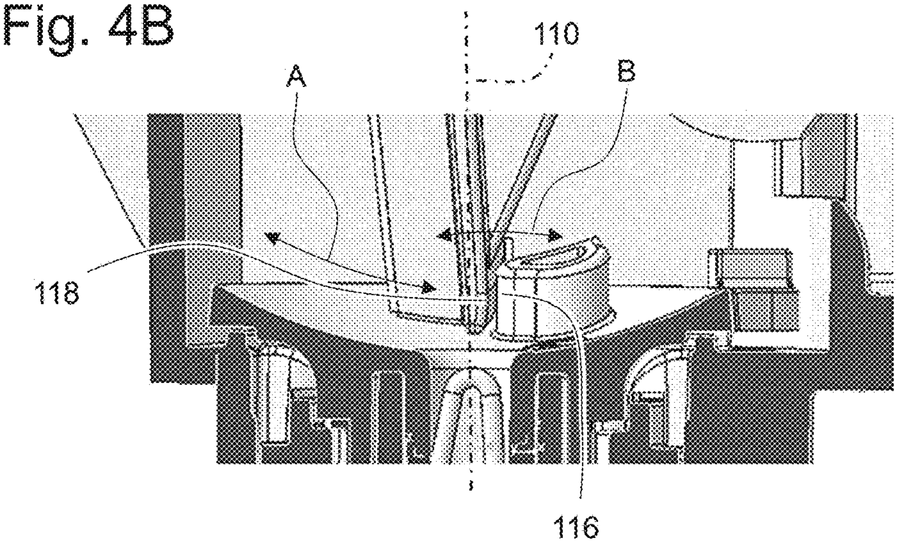
Figure 5:
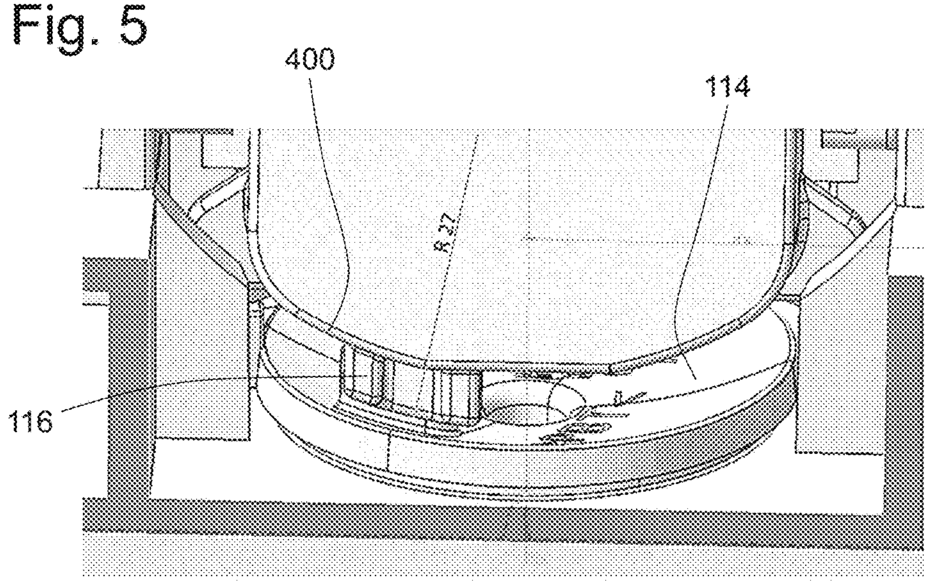
FIG. 5 is a partial rear cutaway view of the embodiment of FIG. 1, showing the latch assembly in a latched configuration.

Referring now to FIGS. 4A, 4B and 5, exemplary aspects of the inventions disclosed herein relate to the configuration of the drive surface 118 and the catch pinion 108. FIGS. 4A and 4B show the intersection of the drive surface 118 and the activation surface 116 as viewed generally perpendicular to the pinion axis 110. FIG. 4A shows the drive surface 118 in a first drive surface position corresponding to a first rotational position of the paddle 104 relative to the base 102. FIG. 4B shows the drive surface 118 in a second drive surface position corresponding to a second rotational position of the paddle 104 relative to the base 102. As shown by the double-headed arrow in FIG. 4B, the drive surface 118 moves through an arc-shaped travel path A as the paddle 104 is rotated about the paddle axis 106.

The drive surface 118 is positioned to engage and move the activation surface 116 as the drive surface 118 moves along the drive surface travel path A. Specifically, the activation surface 116 is movable between a first drive surface position as shown in FIG. 4A and a second drive surface position as shown in FIG. 4B. This movement is through a second travel path, as shown by double-headed arrow B, which corresponds to an arcuate movement about the pinion axis 110. In their respective first positions, the drive surface 118 and the activation surface 116 are adjacent one another (although it may be possible to pivot the drive surface 118 back out of engagement with the activation surface). As the drive surface 118 moves along its travel path A, it continuously contacts and generates a force to drive the activation surface 116 though its travel path B, until the drive surface 118 and activation surface 116 reach their respective second positions.

It has been found that the nature of the contact between the drive surface 118 and the activation surface 116 can affect the performance of the latch assembly 100. Specifically, the shapes of the drive surface 118 and activation surface 116 can change the physical feel of the latch assembly 100 by providing varying degrees of resistance throughout the movement of the paddle 104. Various physical parameters may affect the resistance. For example, as the drive surface 118 moves along its path A, the particular part of the drive surface 118 in contact with the activation surface 116 may move closer or further from the paddle axis 106, resulting in reduced or increased resistance to the force applied by the user. Similarly, as the activation surface 116 moves along its path B, the portion of the activation surface 116 contacted by the drive surface 118 may move closer or further from the pinion axis 110, resulting in increased or decreased resistance. Still another factor is the angular position about the pinion axis 110 of the point of contact between the drive surface 118 and the activation surface 116. Such changes in resistance are functions of conventional lever mechanics, which need not be described herein. The amount of resistance also can depend on friction, the strength of any return springs, and other variables that need not be discussed.

In the embodiment of FIGS. 4A and 4B, the drive surface 118 and activation surface 116 may be configured to provide a particular resistance profile, which is the level of resistance felt at the paddle 104 as a function of paddle rotation position. For example, in the first position, shown in FIG. 4A, the drive surface 118 may contact the activation surface 116 at a position that provides relatively little resistance, whereas in the second position, shown in FIG. 4B, the level of resistance may be greater. During the transition from the first position to the second position, the level of resistance may gradually increase, or it may increase in discrete steps. Gradually increasing resistance may be facilitated by contouring the drive surface 118 and the activation surface 116 to have a rolling contact point, similar to classic gear engagement contact. In the shown example, the distal end 400 of the drive surface 118 may have a backwards curve to provide a gradual increase in resistance at the tip. In contrast, if the distal end 400 were straight, it could reach a point where it lies flat against the activation surface and the point of contact would rapidly change from being at the upper end of the activation surface 116 to the base of the activation surface 116, resulting in a sudden increase in resistance. Other alternatives and variations will be apparent to persons of ordinary skill in the art in view of the present disclosure.

FIGS. 4A and 4B also illustrate an example of an arrangement for the activation surface 118, drive surface 116 and the upper surface 114 of the pinion plate 112. The upper surface 114 has a concave recess that is shaped to receive the distal end 400 of the drive surface 118 as the drive surface 118 moves between the first drive surface position and the second drive surface position. This configuration can help reduce the overall height of the assembly, and also provide a larger region of space in which the drive surface 118 can contact the activation surface 116.

FIG. 5 illustrates another example of an interface between an activation surface 118 and a drive surface 116. In this case, the assembly is viewed from the back side of the activation surface 118 (i.e., the side facing away from the drive surface 116. The distal end 400 of the activation surface 118 is contoured to fit within the concave recess of the upper surface 114 of the pinion plate 112. More specifically, the corners of the distal end 400 are curved in a shape approximating the shape of the concave recess, such that the central portion of the distal end 400 can protrude further towards the upper surface 114 throughout its path of travel. In this case, the drive surface 118 extends across the full width of the pinion plate 112, but this is not strictly required. In other examples, such as the one shown in FIG. 2, the drive surface 118 may extend across only so much of the pinion plate 112 as is necessary to maintain contact with the activation surface 116 through out its operating travel path. Also, the curved corners may be replaced by angled edges or other shapes that approximate the shape of the concave recess.

FIGS. 6 through 13C illustrate an example of how to assemble the various parts of the latch assembly 100, and show other inventive features of embodiments of the invention. FIGS. 6A and 6B show a first step in the assembly process, in which the release members 120 are slid into corresponding tracks 604 within the base 102. Each exemplary release member 120 includes a gear rack 600 that is attached to a catch receiver 602. Each gear rack 600 extends generally linearly, and has a series of teeth arranged in a row.

Figure 6A:
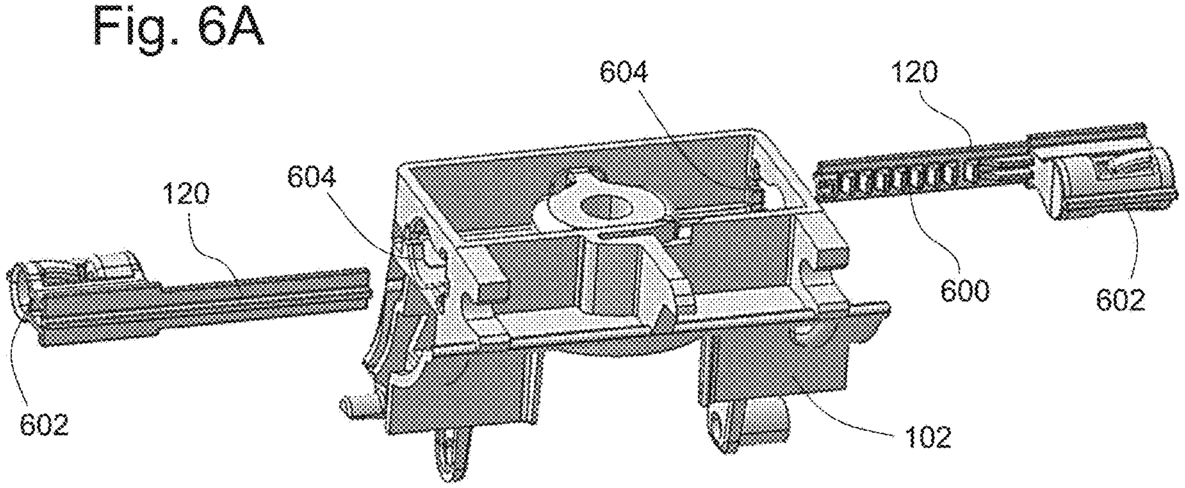
FIGS. 6A and 6B are exploded and assembled views, respectively, of the latch base and release members of the embodiment of FIG. 1.
Figure 6B:
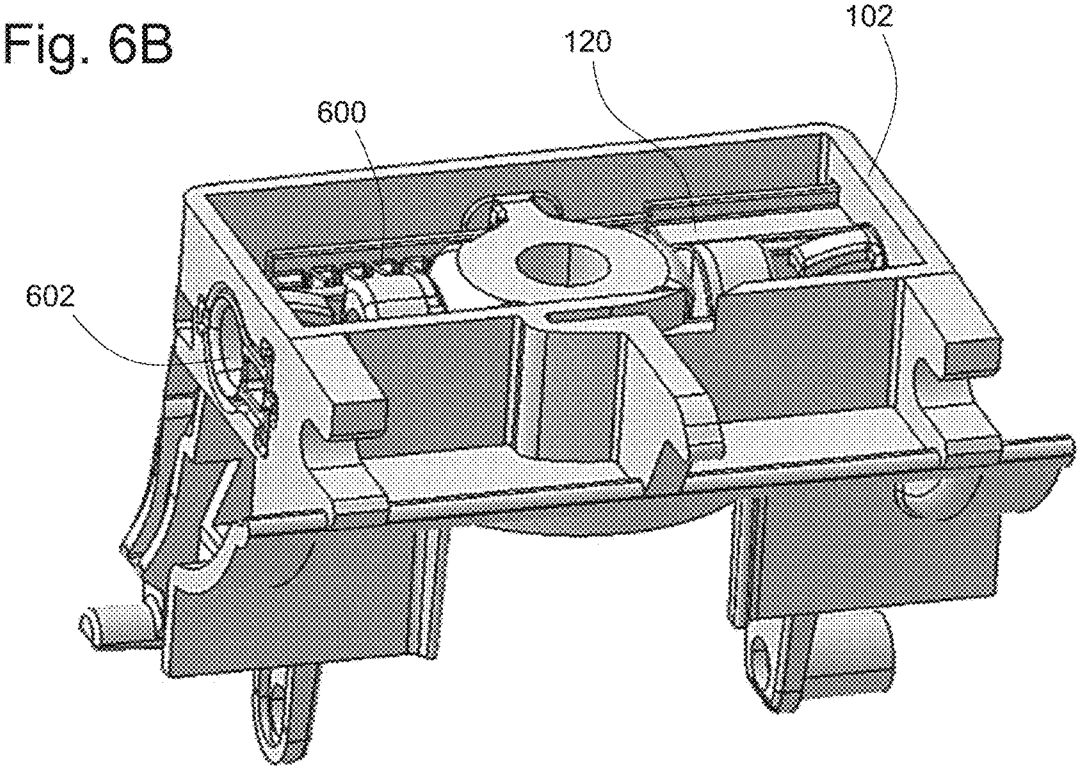

As shown in FIG. 6B, the release members 120 may be slid into place within the base 102 to a fully retracted position, which may be helpful to place them in proper registration for subsequent assembly steps, such as described below. Two release members 120 are shown, but a single release member or more than two release members may be used in other embodiments. The tracks 604 are shaped to slidingly receive the release members 120, such that each release member 120 is linearly movable along a respective sliding axis between a first position corresponding to the latch assembly 100 being in a latched state, and a second position corresponding to the latch assembly 100 being in an unlatched state. The two sliding axes may be parallel to one another, such as shown in the Figures, but alternatively they may be angled relative to one another (e.g., three release members having sliding axes oriented in a plane at 120° to one another to form a triangular latch assembly, etc.).

FIGS. 7A and 7B illustrate the assembly of the catch pinion 108 to the base 102. In the shown example, the catch pinion 108 has a drive gear 700 that extends from and is rotationally fixed to the pinion plate 112, and a lower bearing surface 702 extending from the drive gear 700. The drive gear 700 has teeth that are shaped to mesh with the teeth of the gear racks 600.

The catch pinion 108 is installed by sliding it into an opening 712 formed in the base 102. When fully inserted (FIG. 7B), the drive gear 700 is positioned between, and in engagement with, the two gear racks 600. Thus, rotation of the catch pinion 108 causes the drive gear 700 to engage the gear racks 600 to slide the release members 120 along respective linear paths between first and second release member positions. The first and second release member positions generally correspond to the first and second positions of the activation surface 116.

The catch pinion 108 is fixed in the radial direction on the pinion axis 110 by contact between the lower bearing surface 702 and a corresponding lower bearing receiver 704, and by contact between an upper bearing surface 706 (which may be formed at the outer perimeter of the pinion plate 112 or elsewhere) and an upper bearing receiver 708. The bearing surfaces 702, 706 and bearing receivers 704, 708 may comprise durable plastic materials, metal materials (e.g., bronze), or the like, to provide low friction and wear resistance. Lubrication or low-friction liners also may be provided to reduce friction and provide a secure fit. In other embodiments the catch pinion 108 may be held on the pinion axis 110 by other means. For example, the catch pinion 108 may have a cylindrical bore to receive a pin located in the base 102. Other alternatives and variations will be apparent to persons of ordinary skill in the art in view of the present disclosure.

FIG. 7A also illustrates an example of an alternative catch pinion 710 that may be used with some embodiments. The operation of this catch pinion 710 is described in more detail below with reference to the embodiment of FIGS. 24 through 26. In some embodiments the base 102 may be configured to receive different types of catch pinions, paddles, and other mechanisms in order to accommodate various different final product requirements. For example, the base 102 may be reconfigured as a non-locking latch assembly, or a locking latch assembly such as those described below.

Figure 8:
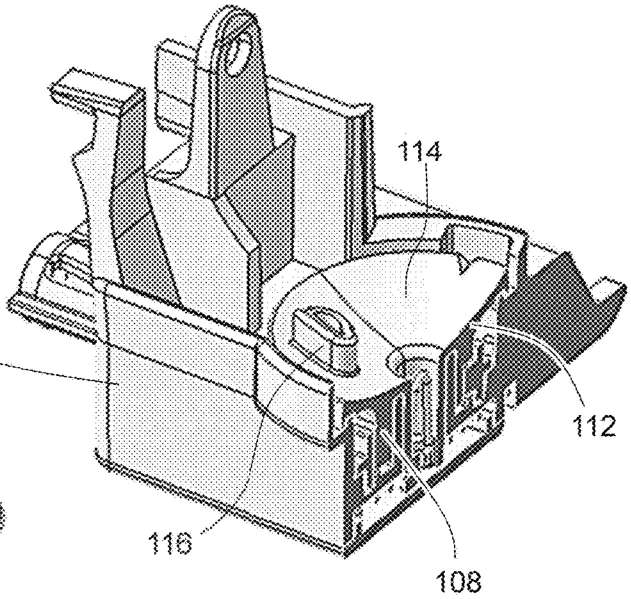
FIG. 8 is a cutaway view of the latch base assembly of FIG. 1.

It may be desirable in some embodiments to at least partially enclose the operative parts of the catch assembly. For example, it may be desirable to enclose the drive gear 700 and the gear racks 600 in a chamber located inside the base 102. To this end, the tracks 604 may be provided in a chamber within the base 102, such that the base shields the tracks 604 and enclosed portions of the release members 120 from dust and debris. The drive gear 700 of the catch pinion 108 is located inside this chamber in order to engage the gear racks 600. Accordingly, at least a portion of the catch pinion 108 extends through an opening 712 into the chamber. The entry of dust and debris through this opening 712 can be inhibited by shaping a portion of the catch pinion 108 as a cover to seal the opening 712. For example, as shown in FIG. 8, the pinion plate 112 may have a circular outer perimeter that fits within the circular opening 712. If desired, a flexible seal (e.g., an O-ring, flexible skirt seal, or the like) may be provided at the intersection of the pinion plate 112 and the opening 712, or this interface may be shaped with a labyrinthine seal or the like, to further help prevent dust entry.

Figure 9A:
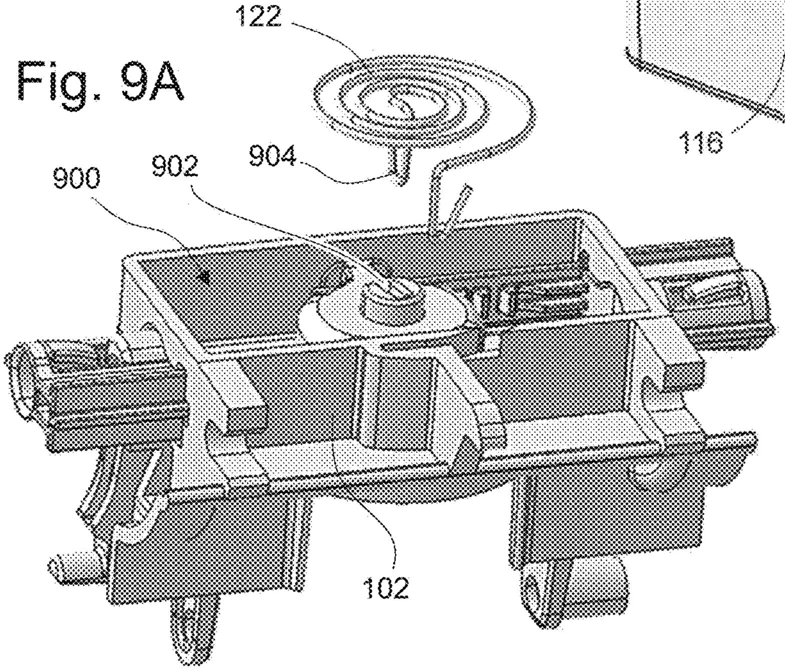
FIGS. 9A and 9B are partially-exploded views of the latch base assembly of FIG. 1 as viewed from the rear.
Figure 9B:
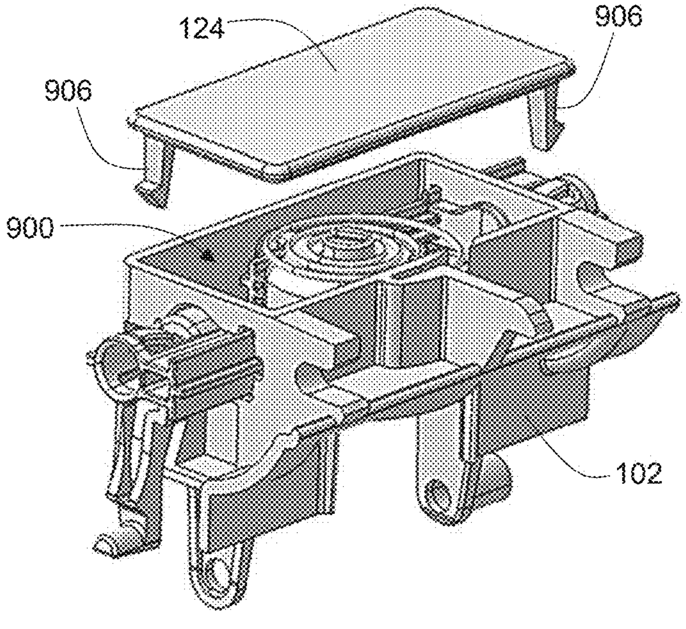

The protective chamber around the catch assembly also may include additional openings to allow assembly or manufacturability of the parts, and corresponding covers for those openings. For example, FIGS. 9A and 9B show a second opening 900 through the base 102 into the chamber. This opening is provided to allow the installation of a pinion return spring 122. A dust cover 124 is provided to enclose the second opening 900 and prevent or inhibit the entry of dust and debris into the chamber that holds the foregoing portions of the catch assembly. The cover 124 may be secured by separate fasteners, flexible catches 906, or the like.

The pinion return spring 122 preferably is configured to bias the pinion into the first pinion position, in which the release members 120 are positioned to lock the latch assembly 100. In this case, the pinion return spring 122 is installed in a minimum pre-compression state when the release members 120 are in their fully-extended position. A rotation force must be applied to resiliently flex the pinion return spring 122 in order to rotate the catch pinion 108 and move the release members 120 to their fully-contracted position. Upon releasing this rotation force, the flexed pinion return spring 122 releases stored energy to rotate the catch pinion 108 back to the first position, and the catch pinion 108 simultaneously drives the release members 120 to the extended latching position. Thus, the pinion return spring 122 also acts as a release member return spring.

The pinion return spring 122 also may serve an additional function of retaining the catch pinion 108 in the base 102. To this end, the pinion return spring 122 may engage a slot 902 on the end of the catch pinion 108, and have a hook 904 that projects into the slot 902 to hook onto a corresponding ledge (not shown) within the body of the catch pinion 108.

Figure 10A:
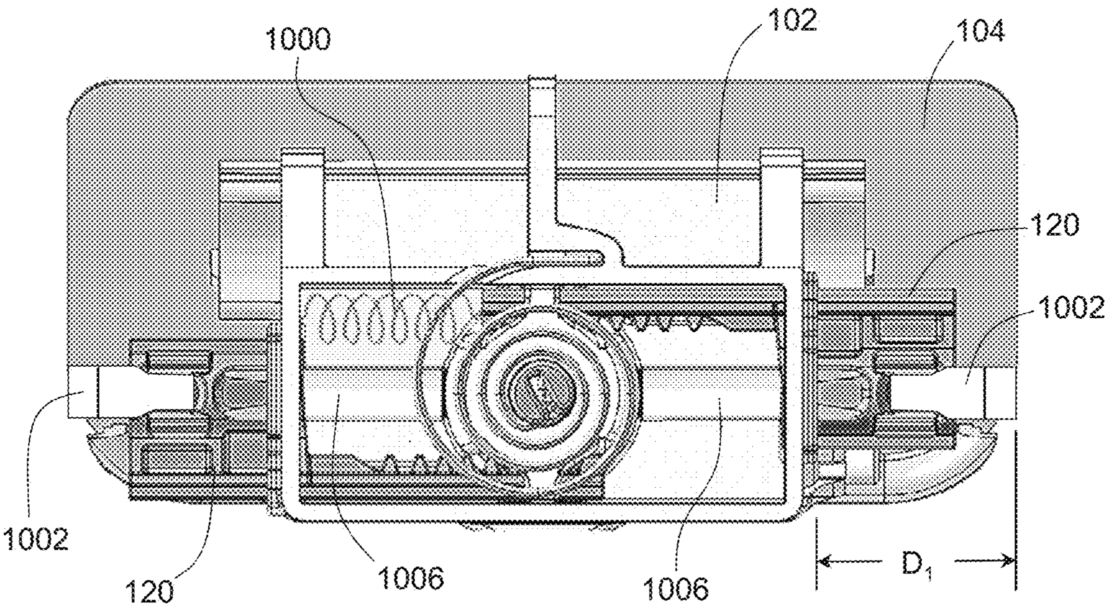
FIGS. 10A and 10B are cutaway rear views of the latch assembly of FIG. 1, shown with the release members in a latched position and the unlatched position, respectively.
Figure 10B:
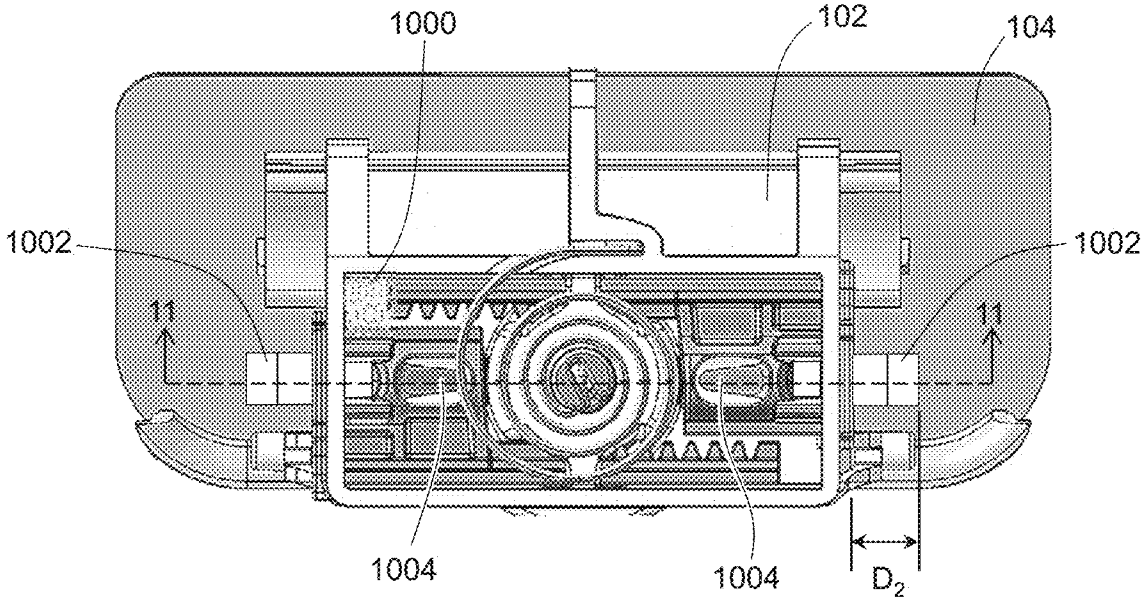
Figure 11:
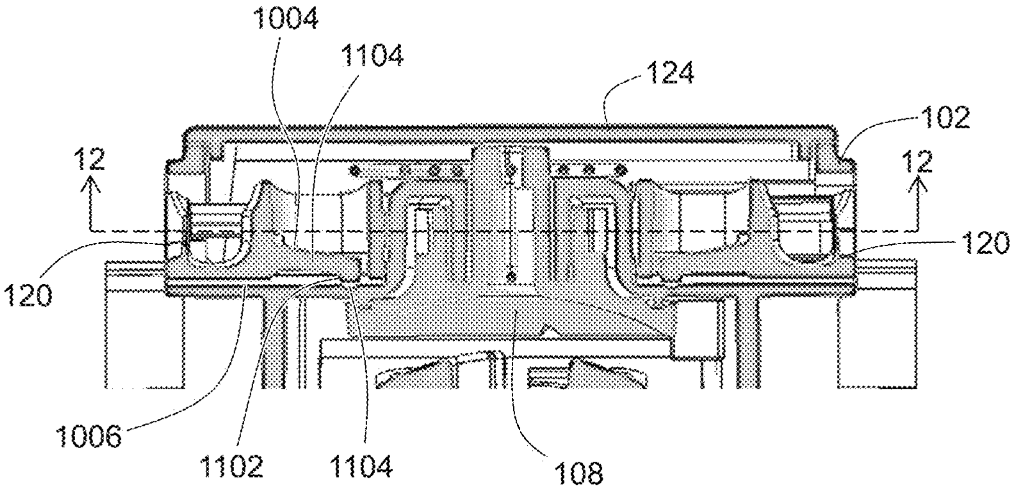
FIG. 11 is a cutaway view of the latch assembly of FIG. 1, shown along line 11-11 of FIG. 10B.

The exemplary pinion return spring 122 is a helical spring, but other kinds of spring may be used. The pinion return spring 122 also may be supplemented or replaced by other return springs. For example, each release member 120 may have its own separate spring operatively connected between the release member 120 and the base 102. FIGS. 10A and 10B show one example of a release member return spring 1000 that is positioned directly between a release member 120 and the base 102. A single release member return spring 1000 may be used in this embodiment (and the pinion return spring 122 may be omitted), as the force generated by the release member return spring 1000 can act on both release members 120 through the engagement of the gear teeth on their respective gear racks 600 and the drive gear 700. However, multiple redundant springs also may be used. Other alternatives and variations will be apparent to persons of ordinary skill in the art in view of the present disclosure.

FIGS. 10A and 10B illustrate the movement of the release members 120 between their extended first positions (FIG. 10A), and their relatively retracted second positions (FIG. 10B). The distal end of each release member 120 may be formed as, or be rigidly connected to, a catch 1002, such as a wedge-shaped pawl. Alternatively, one or both release members 120 may have a catch receiver 602 that receives a remotely-positioned catch, as discussed in more detail below. In the first position, each release member 120 (whether it is a catch receiver 602 or a pawl or other catch structure) may extend a first distance $D_1$ outside the base 102. The first distance $D_1$ may be the same for both release members 120 (e.g., both are about 0.5 inches), or they may be different (e.g., one first distance may be about 0.75 inches, and the other may be about 0.5 inches). In the second position, each release member 120 extends a second distance $D_2$ outside the base 102, with the second distance $D_2$ being less than the respective first distance $D_1$. As with the first distances $D_1$, the second distances $D_2$ of the two release members 120 may be the same or different in magnitude. The second distance $D_2$ may be a positive value (i.e., extending some distance outside the base 102), zero (i.e., flush with the base 102), or negative (i.e., retracted into the base 102).

The release members 120 or base 102 also may include features to help reduce or prevent unwanted movement or rattling of the release members 120 relative to the base 102. For example, the release members 120 may include resilient tabs 1004 that extend from the release members 120 to contact a surface 1006 on the base 102. Exemplary tabs 1004 are shown in more detail in FIG. 11, which is a cross section along the line 11-11 in FIG. 10A. Each tab 1004 comprises a cantilevered arm 1100 with a terminal end 1102 that is positioned in contact with the base surface 1006 along all or part of the movement path of the release member 120. During such contact, contact between the terminal end 1102 and the surface 1006 causes the arm 1100 to bend slightly to generate a force to bias the release member 120 in place within its track 604, and prevent rattling. The surface 1006 may extend through the entire normal working travel distance of the tabs 1004 to provide an anti-rattling feature at all operative positions. The surface 1006 also may have one or more detents 1104 at which the terminal end 1102 is free to move slightly to reduce or eliminate the flexing of the arm 1100. Such detents 1104 may be beneficial to provide a positive position to resiliently hold the release members 120. It will be appreciated that the tabs 1004 may be formed or provided as part of the base 102, instead of the release members 120, in which case the operation would be the same but with the parts juxtaposed. Other alternatives and variations will be apparent to persons of ordinary skill in the art in view of the present disclosure.

Figure 12:
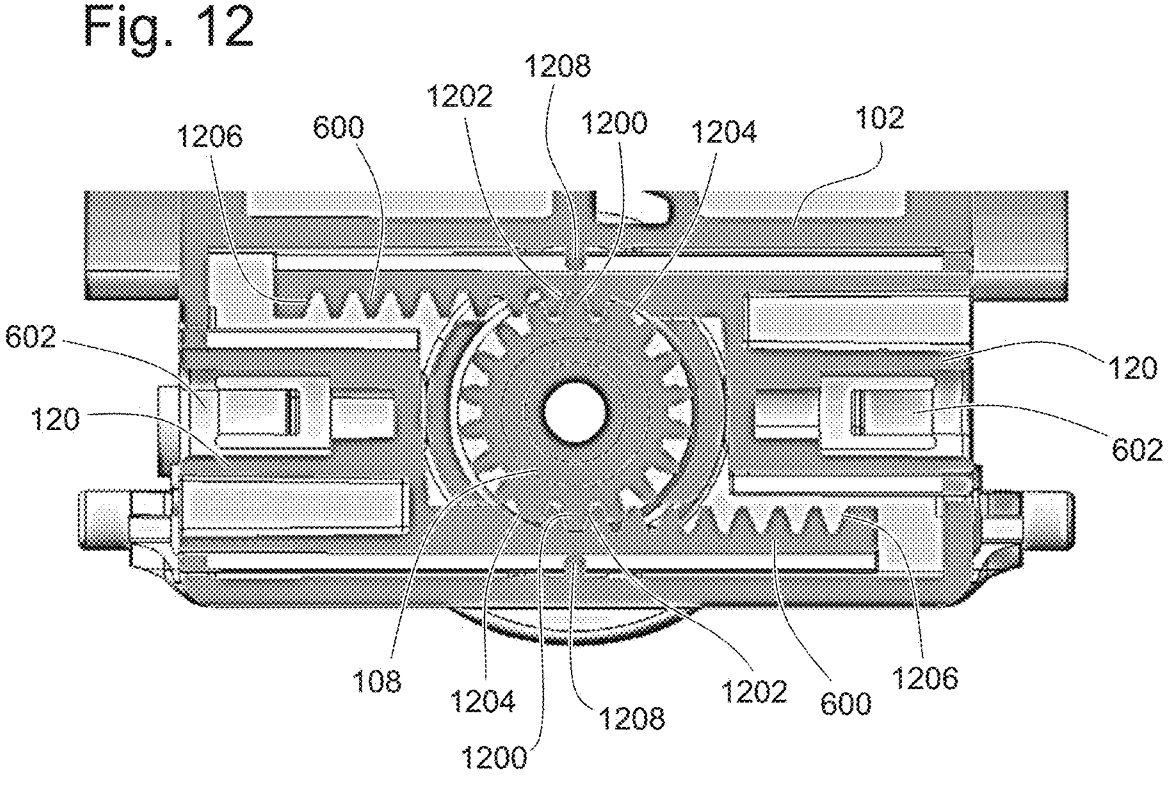
FIG. 12 is a cutaway rear view of the latch assembly of FIG. 1, shown along line 12-12 of FIG. 11.

FIG. 12 is a cross-section view of a latch assembly 100 showing the engagement of the drive gear 700 with the gear racks 600 of the release members 120. As shown here, the release members 120 may be shaped with the drive gear 700 located directly between the two gear racks 600, and directly between the two catch receivers 602. Thus, the catch receivers 602 are axially aligned with the drive gear 700, and move towards and away from the drive gear 700 in use. This provides a compact design and relatively balanced operating forces, but this configuration is not strictly required in all embodiments. FIG. 12 shows the release members 120 in the fully-retracted position, which preferably corresponds to the unlatched position of the latch assembly 100.

It has been found that consistent assembly of the parts of a latch assembly is an ongoing challenge because the parts can be difficult to align properly, and errors may be difficult to discover. The latch assembly 100 may include various features to help prevent or reduce the likelihood of assembly errors. For example, the drive gear 700 may have one or more oversized teeth 1200 or similar features that only fit into a single specific respective tooth gap 1202 or other opening in each gear rack 600. Thus, the catch pinion 108 can only be installed when the two release members 120 and the drive gear 700 are oriented properly relative to the base 102. In this example, proper orientation for assembly may be obtained by sliding both release members 120 fully into the base 102, at which point the drive gear 700 can be rotated to a position in which it properly engages both gear racks 600 simultaneously. The gear racks 600 and/or drive gear 700 also may have features to prevent the drive gear 700 from rotating far enough to fully release the gear racks 600. For example, the drive gear 700 may have a blocked tooth gap 1204 that contacts a terminal end 1206 of the gear rack 600 to prevent further rotation that might cause the gear rack 600 to disengage from the drive gear 700. Other alternatives and variations will be apparent to persons of ordinary skill in the art in view of the present disclosure.

The drive gear 700 and gear racks 600 also may include additional features to help prevent looseness, rattling or possible disengagement under high operation loads. For example, the gear racks 600 may be bent slightly towards the drive gear 700, such that the drive gear 700 presses the gear racks 600 in a radial outwards direction when the drive gear 700 is installed between the gear racks 600. Thus, each gear rack 600 acts as a spring-loaded cantilever to generate an engagement force with the drive gear 700 to prevent rattling. Also, the base 102 may include structures, such as fixed protrusions 1208 or resilient tabs that surround the outer sides of the gear racks 600, to help prevent the gear racks 600 from displacing away from the drive gear 700.

It will be appreciated that the foregoing embodiments may be modified in a variety of ways. For example, the gear racks 600 may comprise arcuate gear segments that move along semicircular paths instead of linear gear segments. As another example, the release members 120 may comprise rotating parts, such as gears that are rotatably mounted to the base 102. The drive gear 700 and gear racks 600 also may be replaced by other suitable mechanisms. For example, the drive gear 700 may comprise a smooth or untoothed pinion that contacts similar smooth or untoothed racks on the release members 120, to provide driving engagement by friction rather than mechanical meshing. In this example, the pinion and/or racks may comprise high-friction materials, such as rubber, synthetic rubber, or the like, to help prevent slippage. In another alternative example, the drive gear 700 and gear racks 600 may be replaced by linkages, such as a rotating arm that is driven by the catch pinion and connected by a pivot to a driven arm, or the catch pinion may have a cam surface that moves a release member in the form of a cam follower. Other alternatives and variations will be apparent to persons of ordinary skill in the art in view of the present disclosure.

Figure 13A:
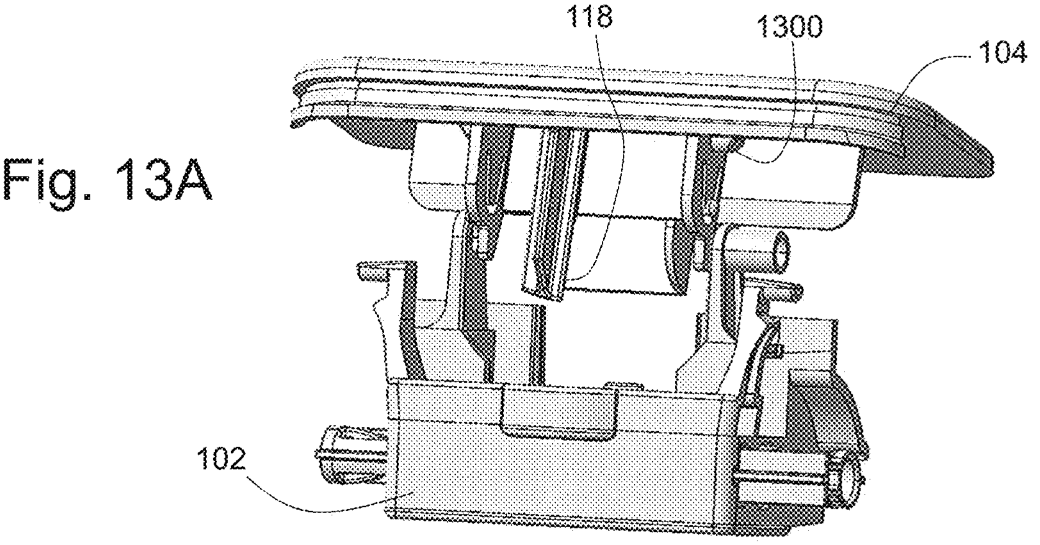
FIG. 13A is a partially-exploded top view of the latch assembly of FIG. 1.
Figure 13B:
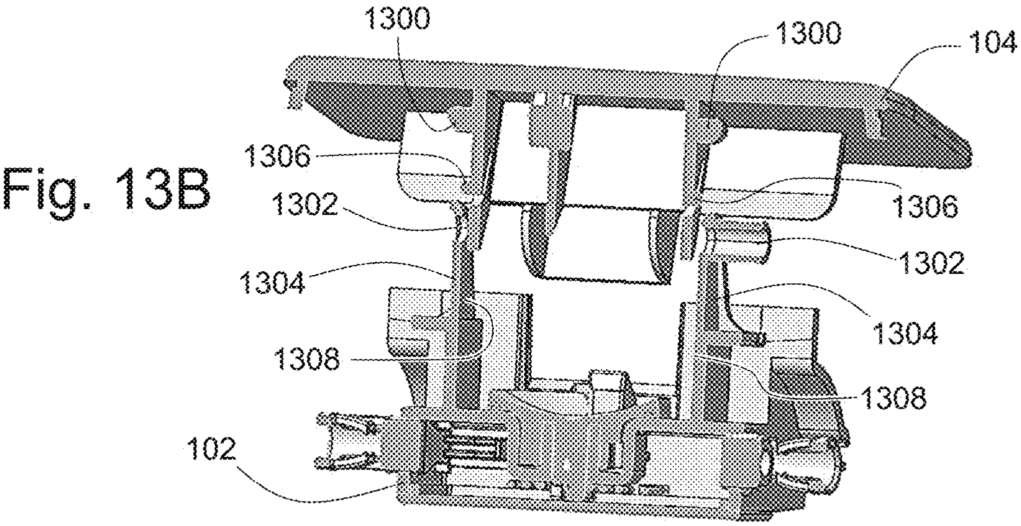
FIGS. 13B and 13C are partially-exploded and assembled cutaway top views, respectively, of the latch assembly of FIG. 1.
Figure 13C:
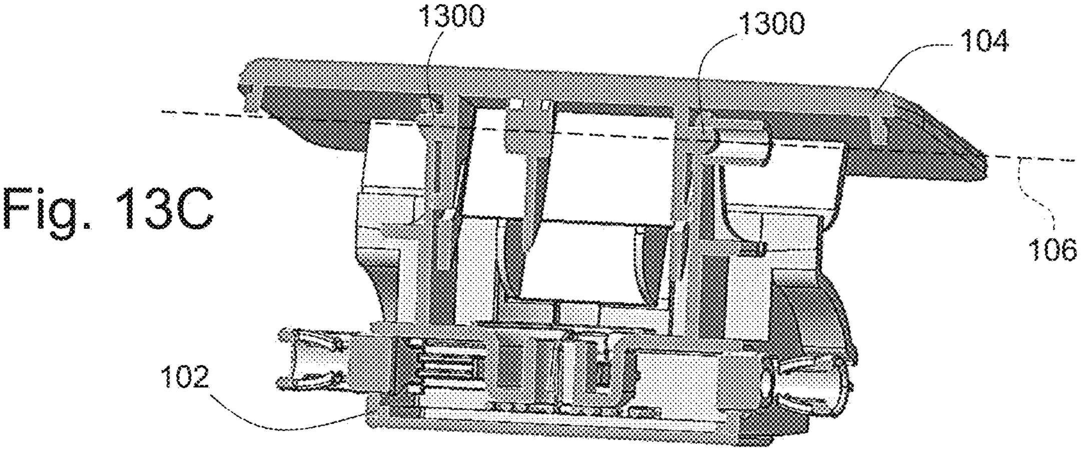

FIGS. 13A through 13C illustrate one example of how the paddle 104 may be assembled to the base 102 to provide a pivoting connection therebetween. FIGS. 13A and 13B are perspective and cutaway views of the paddle 104 and base 102 during the installation process, with the paddle 104 displaced slightly from the base 102. FIG. 13C is a cutaway view showing the parts after assembly. As best shown in FIGS. 13B and 13C, the paddle 104 includes a pair of pivot pins 1300 that extend along the paddle axis 106. Similarly, the base 104 has a pair of pivot bosses 1302, such as cylindrical bores that are located along the paddle axis 106 and shaped to receive the pivot pins 1300. When fully assembled, the pivot pins 1300 fit within the pivot bores 1302 and provide a pivoting connection between the paddle 104 and the base 102. The pivot pins 1300 may be installed within the pivot bores 1302 by temporarily flexing the parts to provide clearance therebetween. For example, the pivot bores 1302 may be mounted on flexible arms 1304 to allow the pivot bores 1302 to be spread apart to receive the pivot pins 1300. The parts also may include chamfers or angled surfaces to help with assembly. For example, the pivot pins 1300 may have angled faces that can push the pivot bores 1302 to the sides as the paddle 104 is moved towards the base 102. In other examples the pivot bores 1302 may comprise or be formed as openable cylindrical chambers (e.g., formed by two shells that fit together), removable straps, or other pivotal mounting arrangements, as known in the art.

The paddle 104 and/or base 102 also may include features to prevent or reduce unwanted rattling or slack movement between these parts. For example, the paddle 104 may include cantilevered tabs 1306 that abut and resiliently engage corresponding surfaces 1308 of the base 102. The cantilevered tabs 1306 generate a force against the surfaces 1308 to cause frictional resistance against moving the paddle 104 relative to the base 102. This frictional force prevents or reduces rattling between the parts. In the exemplary embodiment of FIGS. 13A through 13C, the tabs 1306 extend from the paddle 104 towards the base 102, and contact the arms 1304 that support the pivot bosses 1302. The tabs 1306 press against the surfaces 1308 of the arms 1304 to generate a force that holds the paddle 104 against free movement in a direction along the paddle axis 106, but do not significantly inhibit rotation about the paddle axis 106. Other embodiments may use other frictional connections between the paddle 104 and the base 102. For example, wave or Bellville washers may be placed between the pivot pins 1300 and the pivot bosses 1302, and so on.

FIGS. 14 through 23D illustrate another embodiment of a latch assembly 1400. The latch assembly 1400 may be similar in construction and operation to the one described in relation to FIGS. 1 through 13C. For example, it may be substantially identical to the previous embodiment except as otherwise described herein. However, it will be understood that it is not strictly necessary for embodiments of the latch assembly 1400 to include all or any particular features of the embodiment described above.

Figure 14:
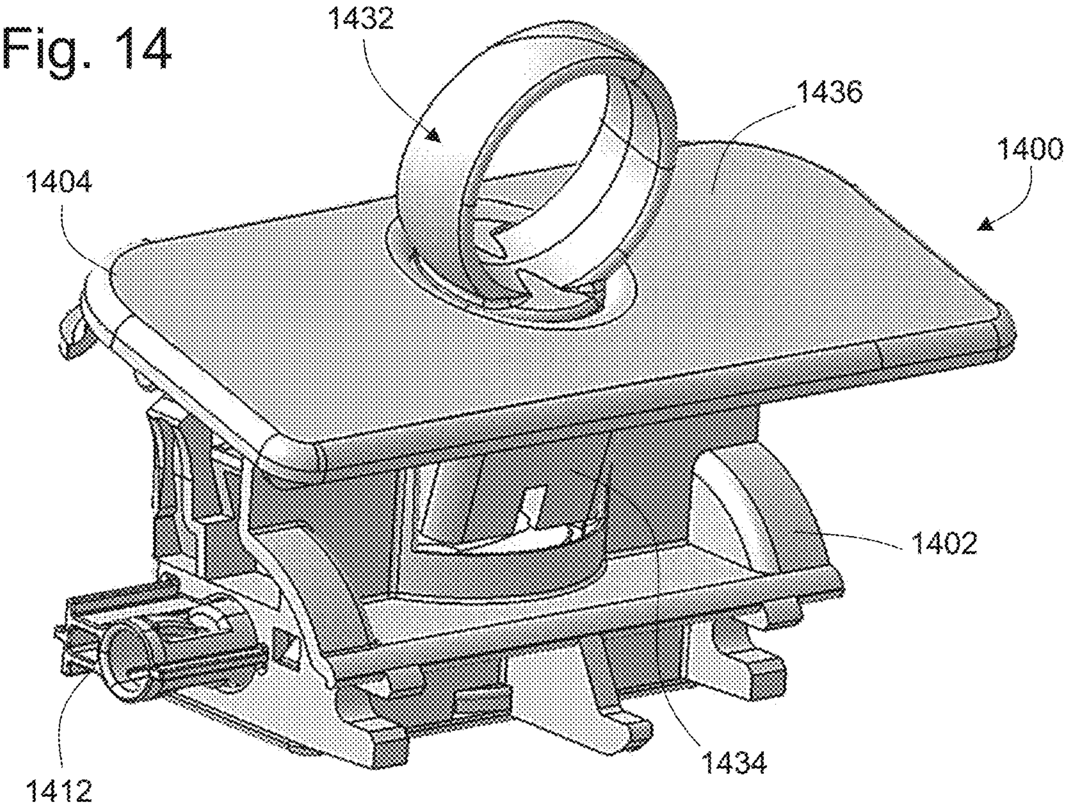
FIG. 14 is an isometric view of another exemplary embodiment of a latch assembly.
Figure 15:
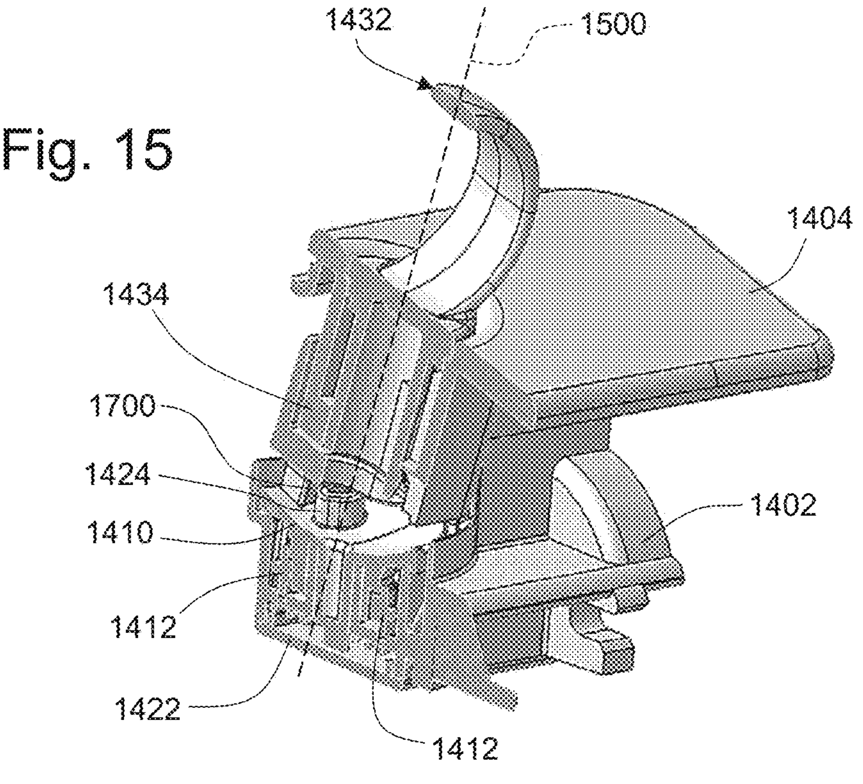
FIG. 15 is a cutaway view of the embodiment of FIG. 14.
Figure 16:
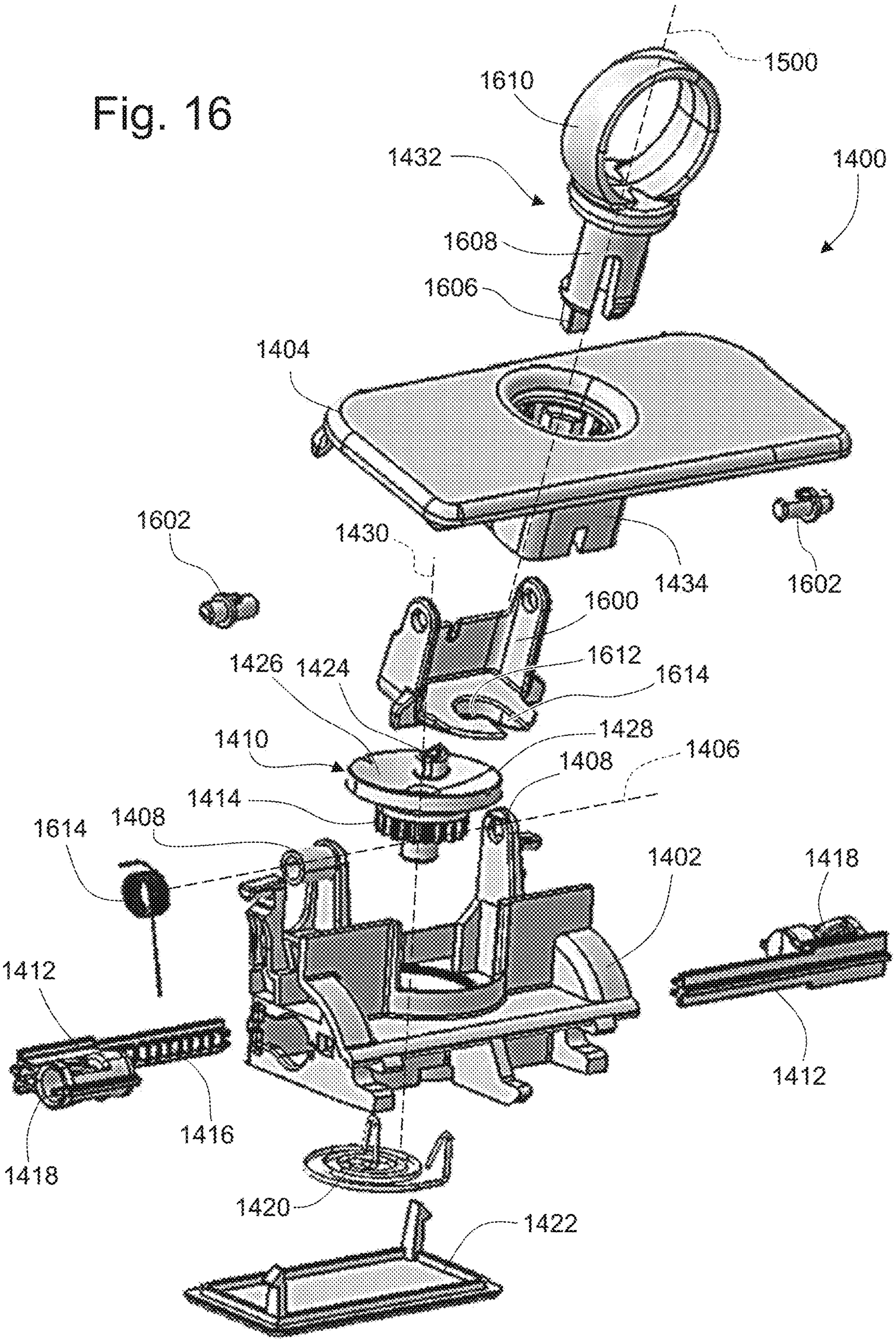
FIG. 16 is an exploded view of the embodiment of FIG. 14.

As best shown in FIGS. 14 through 16, the latch assembly 1400 includes a base 1402 and a paddle 1404 pivotally connected to the base 1402 to rotate about a paddle axis 1406, which may be defined by a pair of pivot bosses 1408. The paddle 1404 is rotatable through a travel path between a first paddle position and a second paddle position.

The base 1402 includes a catch pinion 1410 that is drivingly connected to one or more release members 1412. Such engagement may be, for example, by meshed engagement between a drive gear 1414 rotationally fixed to the catch pinion 1410 and gear teeth 1416 on the release members 1412, or by other mechanisms, such as those described above. Each release member 1412 may comprise a catch receiver 1418 to connect with a remote catch, or an integral or rigidly attached catch structure, such as a pawl. The release members 1412 are movably mounted to the base 1402 between a first position corresponding to the latch assembly 1400 being latched, and a second position corresponding to the latch assembly 1400 being unlatched.

As with the previous embodiment, the latch assembly 1400 includes an activation surface 1424 that is operatively connected to the catch pinion 1410. In the shown example, the activation surface 1424 again comprises a portion of a post that extends from a concave recess formed in an upper surface 1426 of a catch plate 1428. As with the previous embodiment, the catch plate 1428 may cover an opening into a chamber that houses various parts of the catch assembly, such as shown in FIG. 15. Other configurations of an activation surface 1424 may be used in other embodiments. For example, the activation surface 1424 may comprise a pin that extends from a side face of the drive gear 1414, and the catch plate 1428 may be flat instead of concave or omitted. The catch pinion 1410 is mounted to the base 1402 to rotate about a pinion rotation axis 1430, and the activation surface 1424 is located at a position that is offset from the pinion rotation axis 1430. Thus, as before, the activation surface 1424 is movable through a travel path between a first position corresponding to the latch assembly 1400 being latched, and a second position corresponding to the latch assembly 1400 being unlatched.

The latch assembly 1400 also may include features such as a catch pinion return spring 1420, one or more dust covers 1422, a paddle return spring 1604 (described below), and so on.

The latch assembly 1400 includes a lock mechanism that may be operated to selectively prevent or allow the paddle 1404 to be used to move the activation surface 1424 from the latched position to the unlatched position. In this example, the lock mechanism includes a drive surface 1700 that is connected to the paddle 1404 by a movable connection that allows relative movement between the drive surface 1700 and the paddle 1404, and a mechanism, such as a paddle lock 1432, to selectively prevent such relative movement by creating a rigid connection between the paddle 1404 and the drive surface 1700. When the paddle lock 1432 is in a state that allows relative movement between the drive surface 1700 and the paddle 1404, the paddle 1404 can move through its range of travel without applying a force to the drive surface 1700 to move the activation surface 1424; thus, the drive surface 1700 and activation surface 1424 remain in place as the paddle 1404 moves. When the paddle lock 1432 is in a state that prevents relative movement between the drive surface 1700 and the paddle 1404, rotation of the paddle 1404 causes the drive surface 1700 to move through a drive surface travel path that intersects the activation surface 1424, and thereby moves the activation surface 1424 from its first position to its second position. In this example, the paddle lock 1432 comprises a rotating device that fits within a paddle lock barrel 1434 that extends from the outer face 1436 of the paddle 1404 towards the base 1402, but other devices may be used in other embodiments.

Referring to FIGS. 16 and 17, the drive surface 1700 is connected to the paddle 1404 by a lever 1600. The lever 1600 may be integral with the drive surface 1700, or they may be separate parts that are assembled together. The lever 1600 is pivotally connected to the paddle 1404 to rotate about a lever axis 1702, which provides a movable connection between the paddle and the drive surface 1700. In this case, the lever axis 1702 is collinear with the paddle axis 1406 when the parts are fully assembled, but this is not strictly required.

The lever 1600 may be connected to the paddle 1404 by one or more pivot pins 1602, or the like. As shown in FIGS. 17, 18A, 18B and 19, each pivot pin 1600 may pass through a pair of paddle bosses 1800 extending from the paddle 1404, and a pair of lever bosses 1802 located on the lever 1600, to create a pivoting connection between the paddle 1404 and the lever 1600. Each pivot pin 1602 may include a radially-extending tab 1804 that fits within a corresponding slot 1806 that extends from the paddle boss 1800 to prevent relative rotation between the pivot pin 1602 and the paddle 1404. The tab 1804 may terminate at a radially-projecting hook 1808 that snaps into engagement with a back surface of the paddle boss 1800 to prevent the pivot pin 1602 from backing out of the paddle boss 1800. The pivot pin 1602 also may include an annular shoulder 1810 that abuts a front surface of the paddle boss 1800 to prevent over-insertion. Together, the hook 1808 and shoulder 1810 prevent or inhibit movement of the pivot pin 1602 along the lever axis 1702.

FIG. 19 is a cutaway view showing the lever 1600 after it is assembled to the paddle 1404 and pinned in place by the pivot pins 1602. In this embodiment, the lever 1404 is shaped to partially surround the paddle lock barrel 1434, but this is not strictly required.

Figure 20:
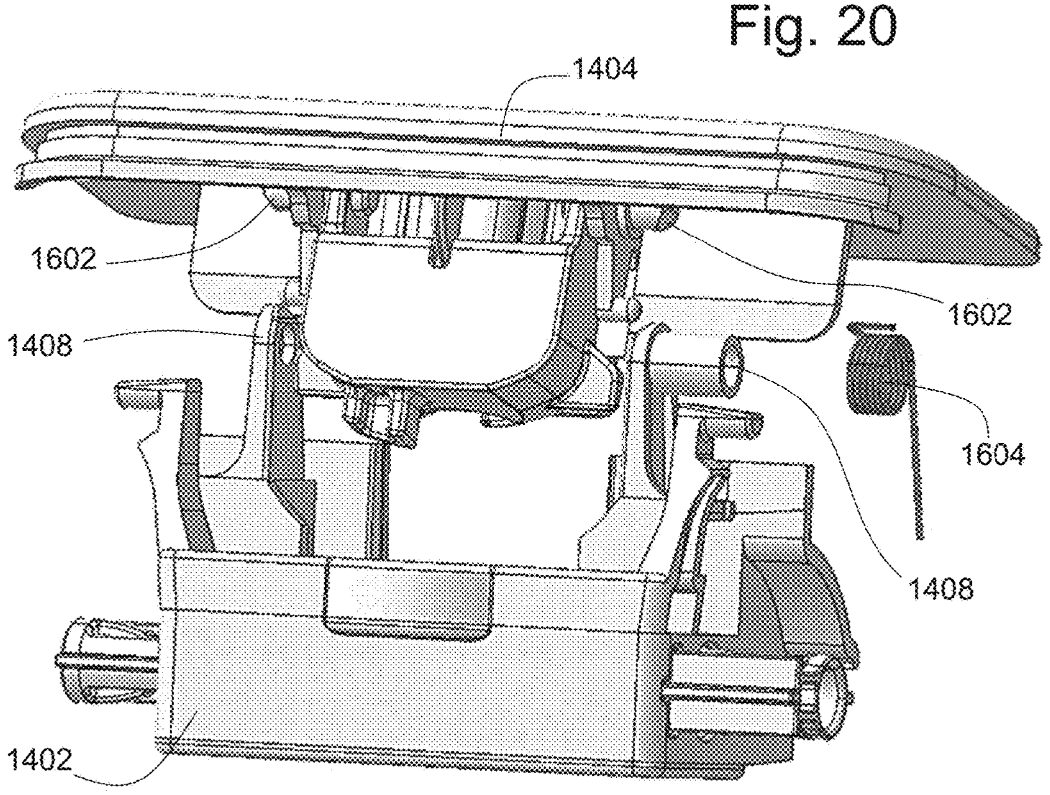
FIG. 20 is a partially-exploded view of the latch assembly of FIG. 14.
Figure 21:
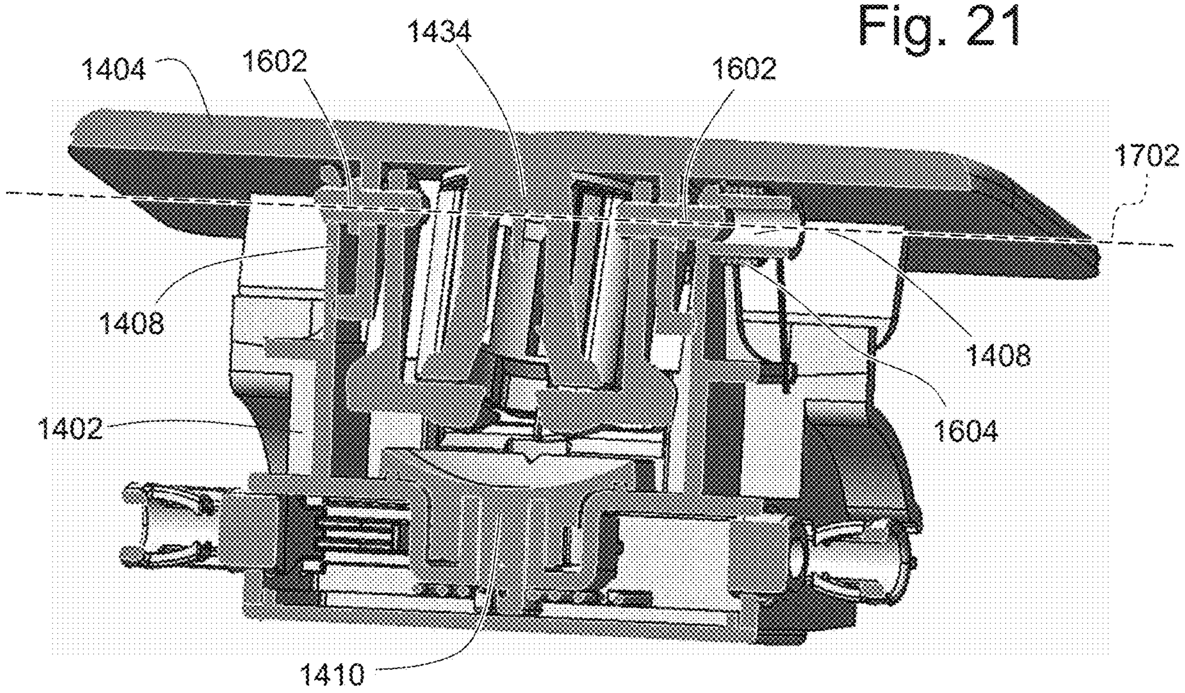
FIG. 21 is a cutaway assembled view of the latch assembly of FIG. 14.

FIG. 20 shows the assembled paddle 1404 and lever 1600 immediately prior to assembly with the pre-assembled base 1402. The assembled paddle 1404 and lever 1600 are connected to the base 1402 by positioning free ends of the pivot pins 1602 into the pivot bosses 1408 on the base 1402. This may be done by spreading the pivot bosses 1408 apart or by other methods, as known in the art. The final assembly is shown in the cutaway view in FIG. 21. Here it is seen that the paddle axis 1406 and lever axis 1702 are collinear, but, as noted above, this is not strictly required. The paddle return spring 1604 may be installed to bias the paddle 1404 to its first position. For example, the paddle return spring 1604 may comprise a helical spring that surrounds one of the pivot bosses 1408 and has a first arm that contacts a portion of the base 1402 and a second arm that contacts a portion of the paddle 1404. The arms are positioned relative to the base 1402 and paddle 1404 such that the amount of flex of the spring increases when the paddle 1404 moves from its first position to its second position, such that the spring generates a restoring force to bias the paddle 1404 back to its first position. Other alternatives and variations will be apparent to persons of ordinary skill in the art in view of the present disclosure.

Figure 23A:
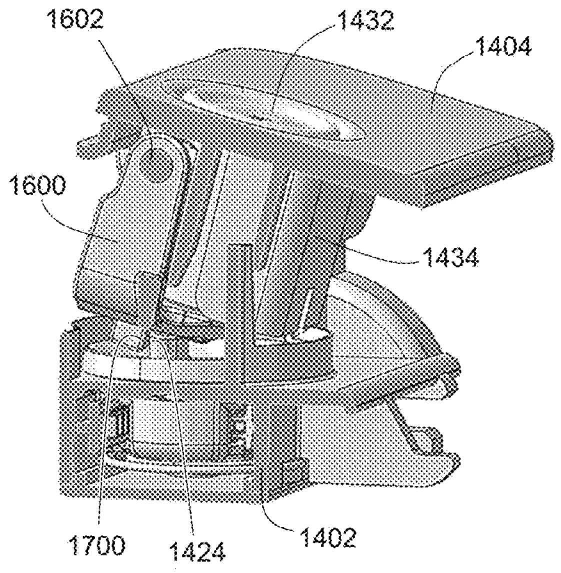
FIGS. 23A and 23B are cutaway and rear views, respectively, of the latch assembly of FIG. 14 shown in a locked and first latched position.
Figure 23B:
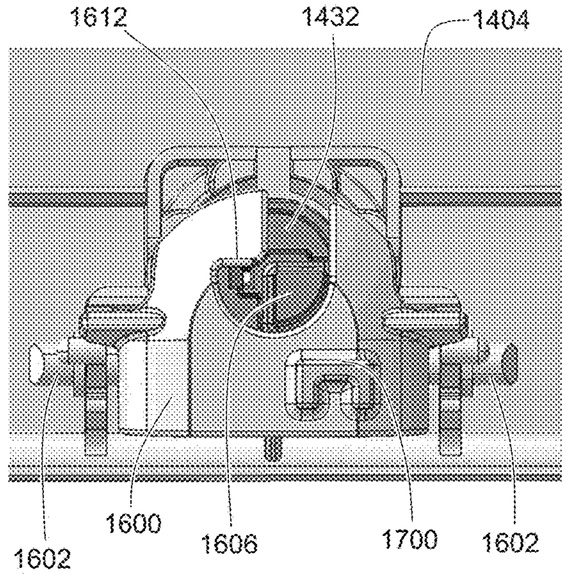
Figure 23C:
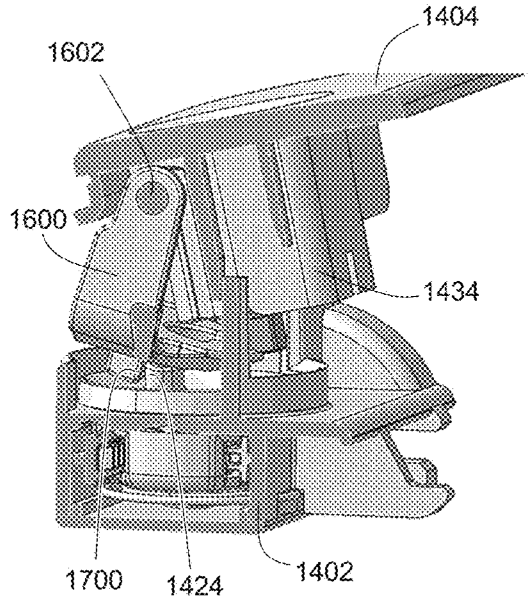
FIGS. 23C and 23D are cutaway and rear views, respectively, of the latch assembly of FIG. 14 shown in a locked and second latched position.
Figure 23D:
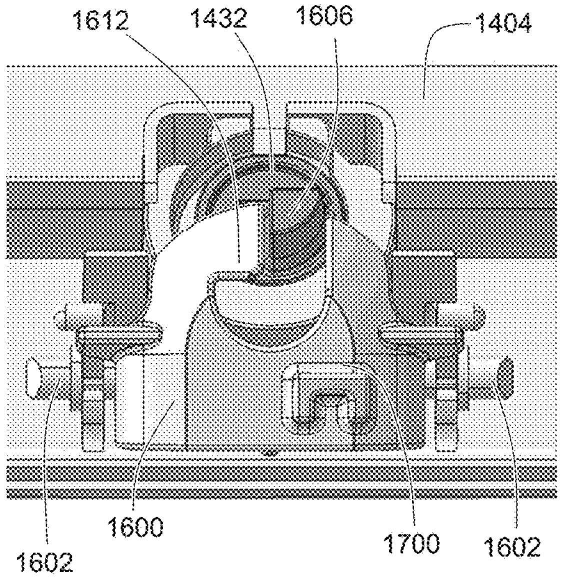

Referring back to FIGS. 14 through 16, an exemplary mechanism for selectively preventing relative movement between the paddle 1404 and the drive surface 1700 is shown as a paddle lock 1432. The paddle lock 1432 is positioned within the paddle lock barrel 1434, and can rotate relative to the paddle 1404 about a lock axis 1500, as shown in FIG. 15. An end of the paddle lock 1432 that is closest to the base 1402 includes a first lock surface 1606 (FIG. 16) that extends generally along the lock axis 1505, but is offset radially from the lock axis 1500. The paddle lock 1432 is rotatable about the lock axis 1500 between a first position in which the first lock surface 1606 is in a first angular location relative to the lock axis 1500 (FIGS. 22B and 22D), and a second position in which the first lock surface 1606 is in a second angular location relative to the lock axis 1500 (FIGS. 23B and 23D). The first and second angular positions are also at different locations along the paddle axis 1406. Thus, as the paddle 1404 is rotated about the paddle axis 1406, the first lock surface 1606 moved through a first travel path when the first lock surface 1606 is in its first position, and a second travel path when the first lock surface 1606 is in its second position. The first and second travel paths are offset from each other along the paddle axis 1406.

The first lock surface 1606 is configured to selectively engage a second lock surface 1612 located on the lever 1600. Engagement between the first lock surface 1606 and the second lock surface 1612 holds the lever 1600 and the drive surface 1700 at a fixed position relative to the paddle 1404, causing them to rotate along with the paddle 1404. The exemplary second lock surface 1612 is located at a distal end of the lever 1600. The second lock surface 1612 is located in the travel path of the first lock surface 1606 when the first lock surface 1606 is in its first position relative to the paddle 1404. In this position, the lever 1600 and the paddle 1404 are locked together, and a force applied to rotate the paddle 1404 about the paddle axis 1406 generates a corresponding force at the drive surface 1700 to move the activation surface 1424 to unlock the latch assembly 1400. In contrast, when the first lock surface 1606 is in its second position, it does not contact the second lock surface 1612, and instead is free to pass through an opening 1614 in the lever 1600. In this position, a force applied to rotate the paddle 1404 will move the first lock surface 1606 through the opening 1614, and will not generate a corresponding force to press the drive surface 1700 against the activation surface 1424. Thus, the paddle 1404 will move freely without unlatching the latch assembly 1400. This type of condition, in which the unlatching mechanism (in this case, the paddle) remains movable even when it is disabled from effecting unlatching of the latch assembly, is sometimes referred to as a “soft” locking system.

Figure 22A:
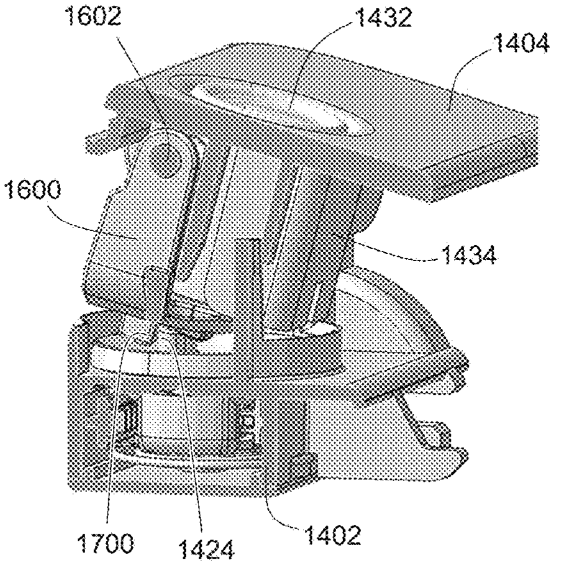
FIGS. 22A and 22B are cutaway and rear views, respectively, of the latch assembly of FIG. 14 shown in an unlocked and latched position.
Figure 22B:
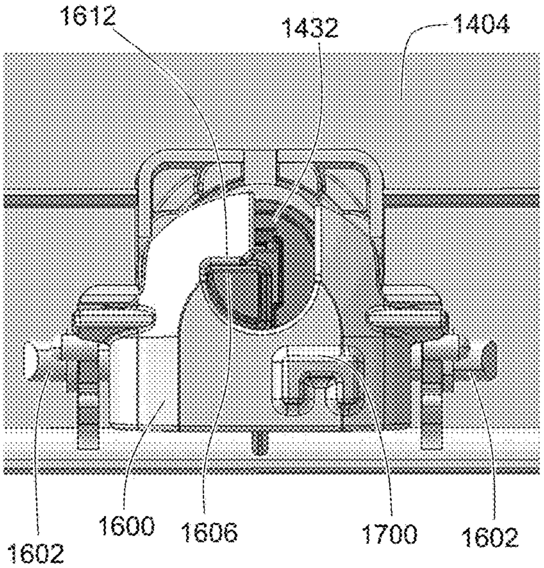

The operation of the paddle lock 1432 is illustrated in detail in FIGS. 22A through 23C. FIGS. 22A through 22D show the latch assembly 1400 with the paddle lock 1432 in the engaged position, in which the drive surface 1700 is locked to move in unison with the paddle 1404. FIGS. 22A and 22B are cutaway and bottom views, respectively, showing the paddle 1404 in its first position, which corresponds to the latch assembly’s latched position (i.e., the position in which the latch assembly 1400 holds together two associated parts, such as a door and a housing). FIGS. 22C and 22D are cutaway and bottom views, respectively, showing the paddle 1404 in its second position, which corresponds to the latch assembly’s unlatched position (i.e., the position in which the latch assembly 1400 does not prevent the two associated parts from being separated or moved relative to one another). In FIGS. 22B and 22D, the base 1402 is removed to more clearly show the operation of the remaining illustrated parts.

Figure 22C:
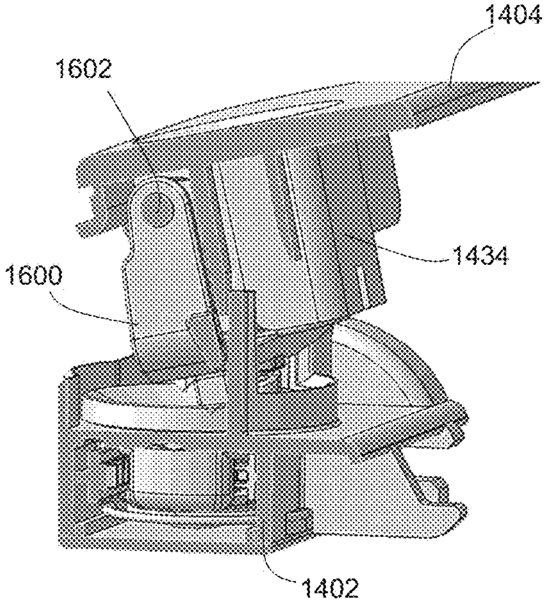
FIGS. 22C and 22D are cutaway and rear views, respectively, of the latch assembly of FIG. 14 shown in an unlocked and unlatched position.
Figure 22D:
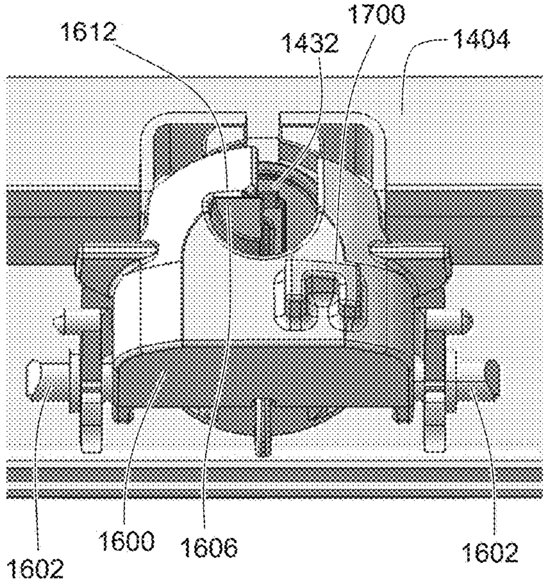

When the paddle lock 1432 is in its engaged position, the first lock surface 1606 abuts the second lock surface 1612, and the drive surface 1700 abuts the activation surface 1424. As the paddle 1404 rotates from the first position to the second position, first lock surface 1606 travels along a path that intersects the second lock surface 1612, and pushes against the second lock surface 1612 to move the lever 1600 and drive surface 1700 in unison with the paddle 1404. At the same time, the drive surface 1700 contacts and moves the activation surface 1424 from its first position, as shown in FIG. 22A, to its second position, as shown in FIG. 22C. This rotates the drive pinion 1410 to move the release members 1412 to place the latch assembly 1400 into its unlatched position, such as described in detail above.

FIGS. 23A through 23D are generally the same views as FIGS. 22A through 22D, however in these views the paddle lock 1432 is in its disengaged position, in which the paddle 1404 is free to move independently of the drive surface 1700. When the paddle lock 1432 is in its disengaged position, the first lock surface 1606 travels through a second path that does not intersect the second lock surface 1612. Thus, as the paddle rotates 1404 from its first position (FIGS. 23A and 23B) to its second position (FIGS. 23C and 23D), the first lock surface 1606 does not contact the second lock surface 1612, and does not apply a force to rotate the lever 1600 and drive surface 1700 against the activation surface 1424. Thus, the latch assembly 1400 remains in its latched position.

From the foregoing, it will be understood that placing the paddle lock 1432 and the first lock surface 1606 in the engaged position corresponds to unlocking the latch assembly 1400, by configuring the latch assembly 1400 such that it can be unlatched by rotating the paddle 1404. In contrast, placing the paddle lock 1432 and the first lock surface 1606 in the disengaged position corresponds to locking the latch assembly 1400, by rendering the paddle 1404 incapable of unlatching the latch assembly 1400.

The exemplary paddle lock 1432 is illustrated in FIGS. 14 through 16 as a simple rotatable knob having a cylindrical shaft 1608 and a ring-shaped handle 1610. This version of the paddle lock 1432 may be used throughout the life cycle of the latch assembly 1400, or provided as a temporary paddle lock 1432 and replaced at a later time with a more conventional keyed barrel lock that has a structure identical or similar to the first lock surface 1606 thereon. In FIGS. 22A through 23D, the paddle lock 1432 is shown as a conventional barrel-type lock for use with a separate key (not shown). A keyed barrel lock may be interchangeable with or a replacement for a knob such as the one in FIGS. 14 through 16. For example, a knob such as the one in FIGS. 14 through 16 may be provided with the latch assembly 1400 to automobile manufacturers, and the automobile manufacturers may replace the knob with a keyed barrel lock to place in the finished automobile. It will also be understood that it is not strictly necessary to include any kind of paddle lock 1432 in other embodiments, and the latch assembly 1400 will have utility as a subassembly product even absent the inclusion of a paddle lock 1432.

It will also be appreciated that the embodiment of FIGS. 14 through 23D may be modified in various ways. For example, the rotary paddle lock 1432 may be replaced by a pushbutton lock, such as a mechanism that reciprocates in a direction perpendicular to the outer surface 1436 of the paddle 1404 and has a first lock surface that moves along the reciprocation axis into and out of engagement with the second lock surface. The rotary paddle lock 1432 also may be replaced by a sliding lock or the like. As another example, the pivoting lever 1600 may be replaced by a body that slides relative to the paddle 1404, a linkage comprising multiple pivoting or sliding parts, or other mechanisms that may be selectively rigidly connected to the paddle 1404. Other alternatives and variations will be apparent to persons of ordinary skill in the art in view of the present disclosure.

Figure 24:
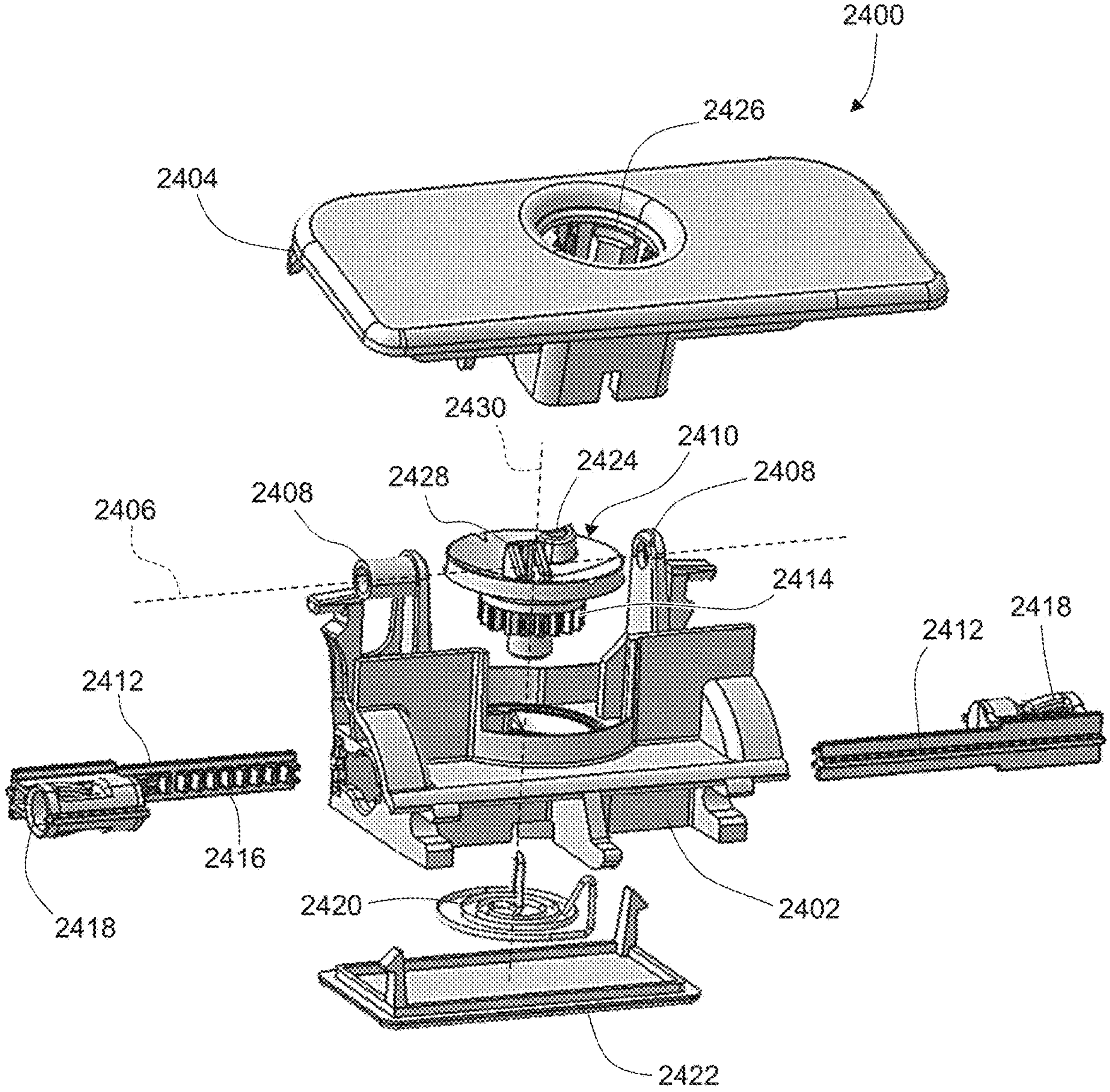
FIG. 24 is an exploded view of another exemplary embodiment of a latch assembly.
Figure 25:
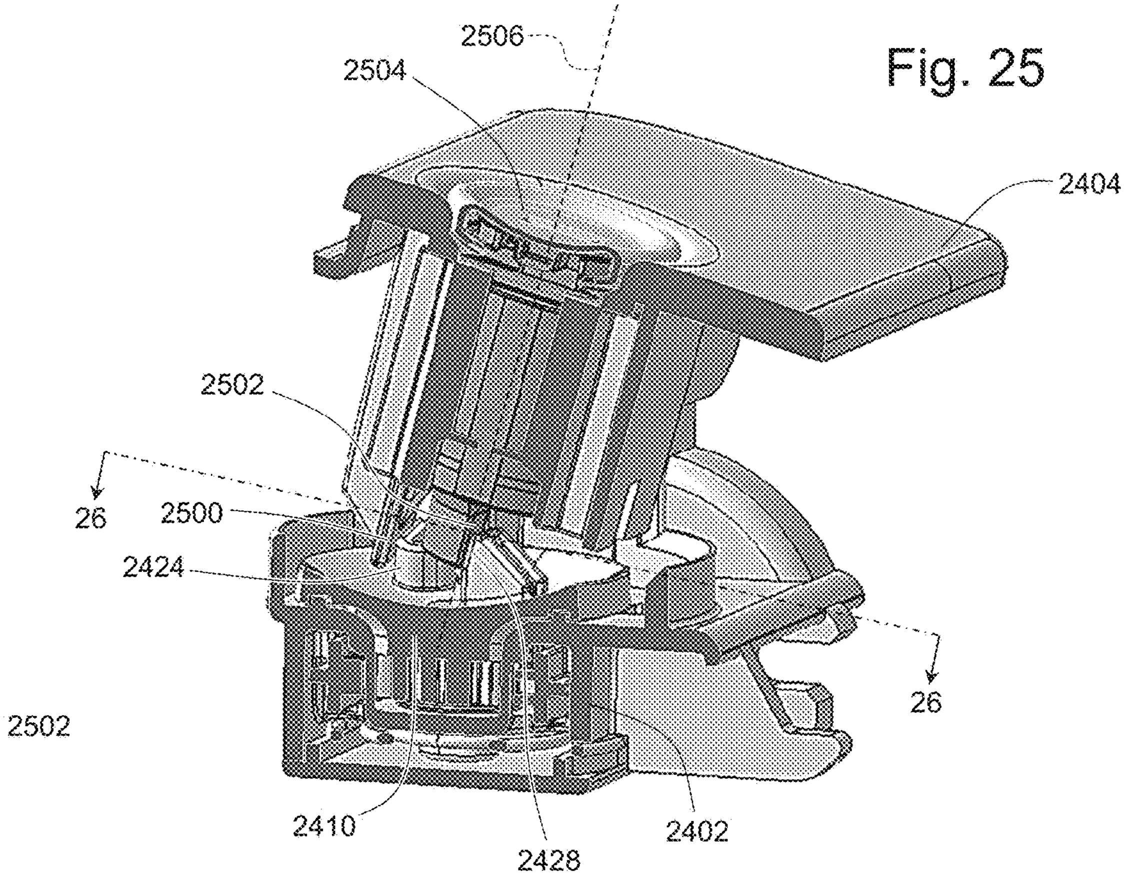
FIGS. 25 and 26 are cutaway assembled views of the embodiment of FIG. 24, showing the engagement of an exemplary lock system.
Figure 26:
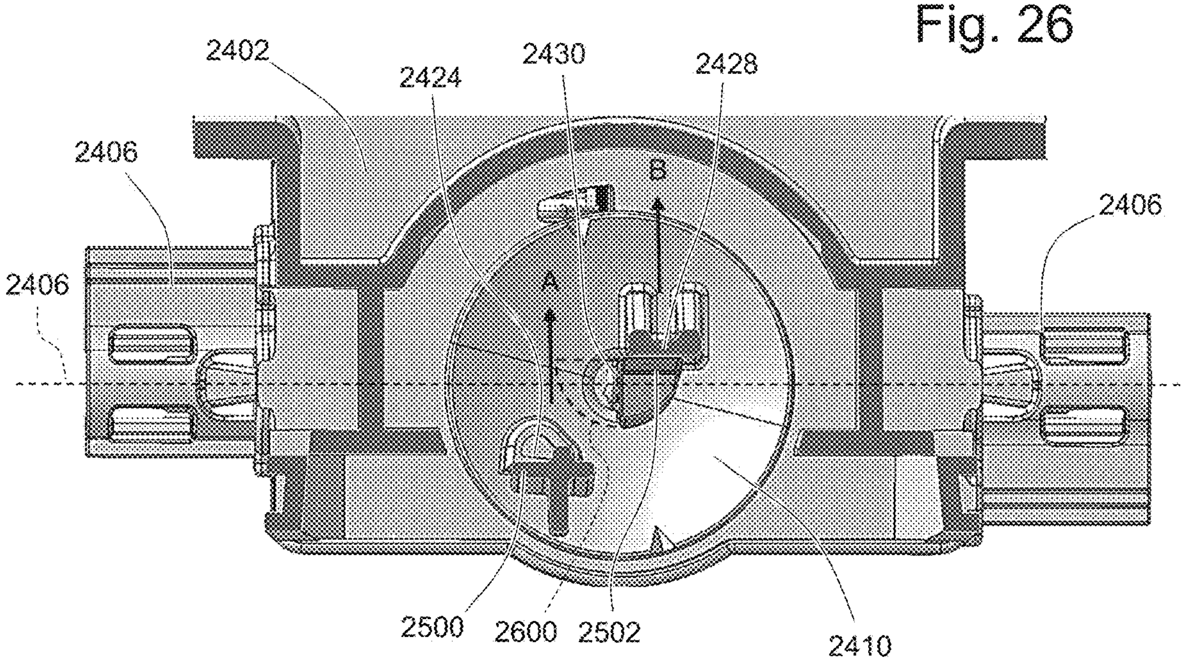

FIGS. 24 through 26 illustrate another embodiment of a latch assembly 2400. The latch assembly 2400 may be similar in construction and operation to the ones described previously herein. For example, it may substantially identical to the previous embodiment except as otherwise described herein. However, it will be understood that it is not strictly necessary for embodiments of the latch assembly 2400 to include all or any particular features of the embodiments described above.

The latch assembly 2400 has a base 2402 and a paddle 2404 pivotally connected to the base 2402 to rotate about a paddle axis 2406 defined by one or more pivot bosses 2408. The paddle 2404 includes a drive surface 2500 (FIG. 25) that is located at a position that is offset from the paddle axis 2406. The paddle 2404 is rotatable between a first paddle position and a second paddle position, and during such rotation the drive surface 2500 moves along a travel path from a first drive surface position to a second drive surface position. In this regard, the operation is similar to the embodiment of FIGS. 1 through 3. Other features of the embodiment of FIGS. 1 through 3, such as the pinion plate 112 and its concave surface 114, also may optionally be incorporated into the present embodiment.

The base 2402 includes a catch pinion 2410 that is drivingly connected to one or more release members 2412. Such engagement may be, for example, by meshed engagement between a drive gear 2414 rotationally fixed to the catch pinion 2410 and gear teeth 2416 on the release members 2410, or by other mechanisms, such as those described above. Each release member 2412 may comprise a catch receiver 2418 to connect with a remote catch, or an integral or rigidly attached catch structure, such as a pawl. The release members 2412 are movably mounted to the base 2402 between a first position corresponding to the latch assembly 2400 being latched, and a second position corresponding to the latch assembly 2400 being unlatched.

The latch assembly 2400 includes an activation surface 2424 that is operatively connected to the catch pinion 2410. The catch pinion 2410 is mounted to the base 2402 to rotate about a pinion rotation axis 2430, and the activation surface 2424 is located at a position that is offset from the pinion rotation axis 2430. Thus, as before, the activation surface 2424 is movable through a travel path between a first position corresponding to the latch assembly 2400 being latched, and a second position corresponding to the latch assembly 2400 being unlatched.

The latch assembly 2400 also may include features such as a catch pinion return spring 2420, one or more dust covers 2422, and so on.

In use, the paddle 2404 may be rotated from its first position to its second position, causing the drive surface 2500 to move from its first position to its second position. Simultaneously, the drive surface 2500 contacts and drives the activation surface from its first position to its second position, to thereby rotate the catch pinion 2410 and displace the release members 2412 to unlatch the latch assembly 2400.

In this embodiment, the latch assembly 2400 also includes a "hard" locking mechanism. In general terms, the hard locking mechanism includes a feature, such as a first lock surface 2502, that is movable between an unlocked position in which the paddle 2404 is free to rotate from the first paddle position to the second paddle position, and a locked position in which the paddle 2404 cannot move to the second paddle position. In the shown exemplary embodiment, the first lock surface 2502 is provided on a rotary barrel lock 2504 that is received within a lock barrel 2426 formed in or connected to the paddle 2404. The barrel lock 2504 is rotatable about a lock axis 2506, and the first lock surface 2502 comprises a protrusion that is fixed to the barrel lock 2504 and extends towards the catch pinion 2410.

The first lock surface 2502 is offset from the paddle axis 2406, such that rotation of the paddle 2404 causes the first lock surface 2502 to sweep through a travel path located near the catch pinion 2410. The first lock surface 2502 is also offset from the lock axis 2506, such that rotation of the barrel lock 2504 displaces the first lock surface 2502 about the lock axis 2506. The barrel lock 2504 and first lock surface 2502 are rotatable between an unlocked position and a locked position. When the first lock surface 2502 is in the locked position, it engages a second lock surface 2428 to prevent the paddle 2404 from rotating. However, when the first lock surface 2502 is in the unlocked position, it does not engage the second lock surface 2428 and the paddle 2404 is free to rotate to the second paddle position to unlatch the latch assembly 2400.

A variety of different configurations may be used for the first lock surface 2502 and the second lock surface 2428. In the shown example, the second lock surface 2428 is provided on the catch pinion 2410, such that rotation of the catch pinion 2410 causes the second lock surface 2428 to move through a travel path about the pinion axis 2430. The first lock surface 2502 is movable to a locked position at a point along the second lock surface's travel path, such that contact between the first lock surface 2502 and the second lock surface 2428 prevents the catch pinion 2410 from rotating. In this position, a force is applied by the drive surface 2500 to the activation surface 2424 is opposed by contact between the first lock surface 2502 and the second lock surface 2428, which locks the latch assembly 2400 by preventing the paddle 2404 from rotating to its second position. The first lock surface 2502 is movable to an unlocked position in which it does not intersect the second lock surface's travel path, to unlock the latch assembly 2400.

The position where the first lock surface 2502 and the second lock surface 2428 contact one another to prevent the catch pinion 2410 from rotating can vary among different embodiments. FIG. 26 shows one example of an arrangement of the first lock surface 2502 and the second lock surface 2428. This Figure shows the assembly in cutaway view along line 26-26 of FIG. 25. The drive surface 2500, catch pinion 2410, and activation surface 2424 are in their respective first positions, corresponding to the latch assembly 2400 being in the latched state. When the latch assembly 2400 is unlocked, an opening force applied by the drive surface 2500 to the activation surface 2424 will rotate the catch pinion 2410 clockwise, as shown in this view. Upon such rotation, the second lock surface 2428 will also rotate clockwise along a travel path from a respective first position to a respective second position. The first lock surface 2502 is positioned in the travel path of the second lock surface 2428, and thus prevents rotation of the catch pinion 2410 and unlatching of the latch assembly 2400. When it is desired to unlock the latch assembly 2400, the first lock surface 2502 is moved to the unlocked position 2600, as shown in dashed lines in FIG. 26. In this position, the first lock surface 2502 does not contact the second lock surface 2428, and does not prevent the paddle 2404 from rotating to unlatch the latch assembly 2400.

The first lock surface's locked position may be selected to prevent the generation of extraneous bending or torque loads on the various parts. For example, in the embodiment of FIG. 26, rotation of the paddle 2404 about the paddle axis 2406 impels the drive surface 2500 along a path shown by arrow A, and impels the first lock surface 2502 along a path shown by arrow B. The path of the first lock surface 2502 is offset, with respect to the paddle axis 2406 from the path of the drive surface 2500. The pinion axis 2430 is located between the two travel paths. Thus, an opening force applied by the drive surface 2500 on the activation surface 2424 in the direction of arrow A causes a reactive force between the second lock surface 2428 and the first lock surface 2502 that is aligned generally along the direction of arrow B (and vice-versa). Thus, the drive surface 2500 and first lock surface 2502 are expected to experience primarily simple bending loads when a load is applied to the paddle 2404.

Other embodiments may place the first and second lock surfaces 2502, 2428 at different locations. For example, the activation surface 2424 and second lock surface 2428 may be located along the paddle axis 2406 on the same side of the pinion axis 2430, and the first lock surface 2502 may be movable to a position that intersects second lock surface's travel path to prevent the catch pinion 2410 from rotating. Other alternatives and variations will be apparent to persons of ordinary skill in the art in view of the present disclosure.

It will also be appreciated that the first lock surface's locking position may be selected at any point along the second lock surface's travel path, so long as contact is made to prevent the paddle 2404 from rotating far enough to release the latch assembly 2400. In many cases, some amount of movement of the paddle 2404 may be acceptable without risking inadvertent unlatching. Nevertheless, in the embodiment of FIGS. 24 through 26, the first lock surface 2502 and its locked position may be selected such that the first lock surface 2502 can only be moved into the locked position when the paddle 2404 is at or very close to its first position. This prevents the paddle 2404 from being moved any appreciable distance when the latch assembly 2400 is locked, to provide a more solid feel to the assembly.

In still other embodiments, the second lock surface 2428 may be positioned anywhere that is stationary relative to the movement of the paddle 2404. For example, the second lock surface 2428 may be a surface that is integrally formed with the remainder of the base 2402. However, it is preferred for the second lock surface 2428 to be a surface formed on or connected to the catch pinion 2410, which can provide a relatively simple and compact arrangement of parts.

Figure 27:
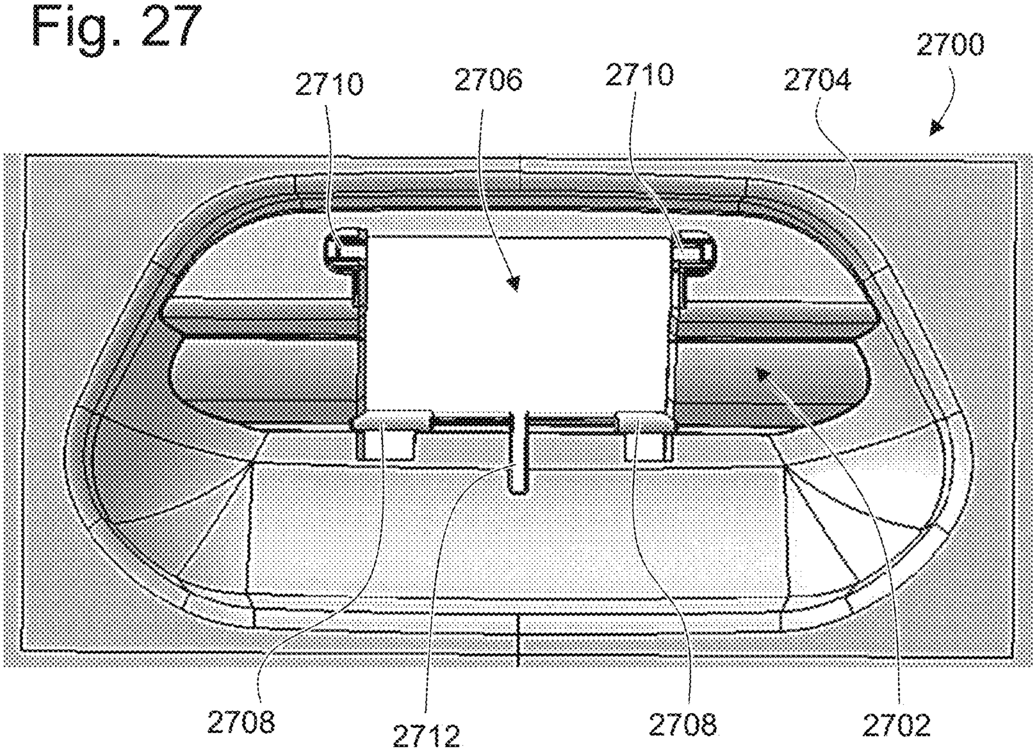
FIG. 27 is a front view of an exemplary door panel into which a latch assembly can be installed.
Figure 28:
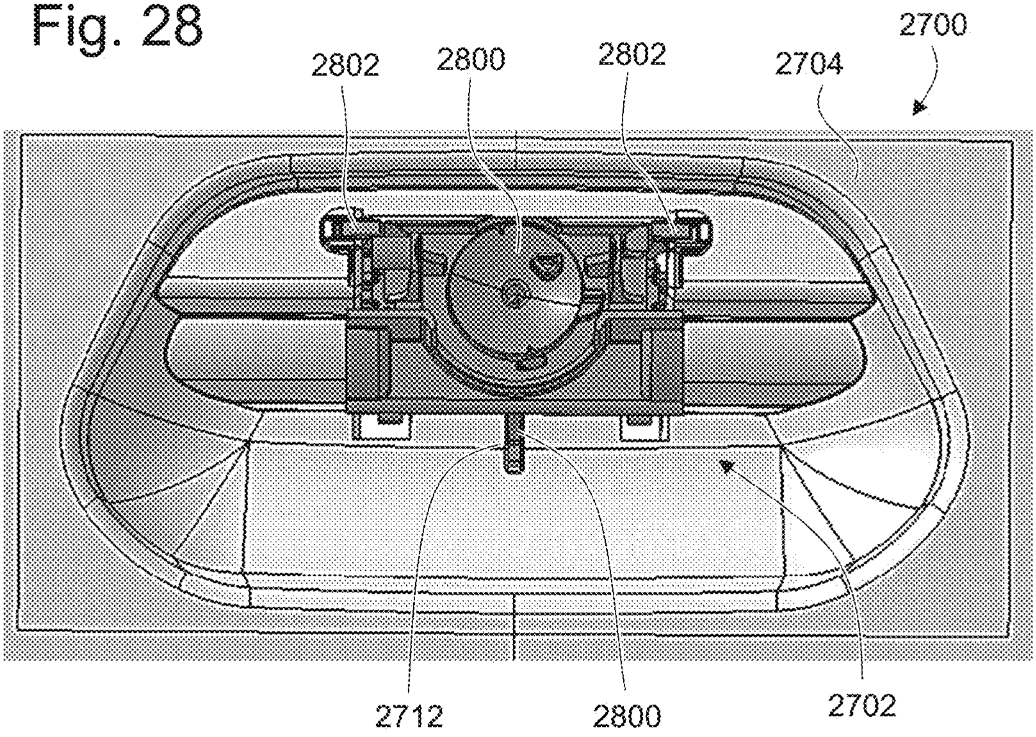
FIG. 28 is a front view of the door panel of FIG. 27, with an exemplary latch assembly base installed therein.

FIGS. 27 through 29C illustrate an example of how a latch assembly of any of the foregoing embodiments may be installed into a door, such as an automobile glove box door. FIG. 27 shows a door 2700 having a recess 2702 formed as a depression in the door's outer surface 2704. The recess 2702 has an opening 2706 for receiving a latch base 2800. The recess 2702 and latch base 2800 may include any variety of cooperating connecting parts to hold the latch base 2800 in place within the recess 2702. For example, the recess 2702 may include one or more pivots 2708 that are received in corresponding pivot slots 2900 located in the latch base 2800. The recess 2702 also may include detents 2710 that receive corresponding protrusions 2802 extending from the latch base 2800.

Figure 29A:
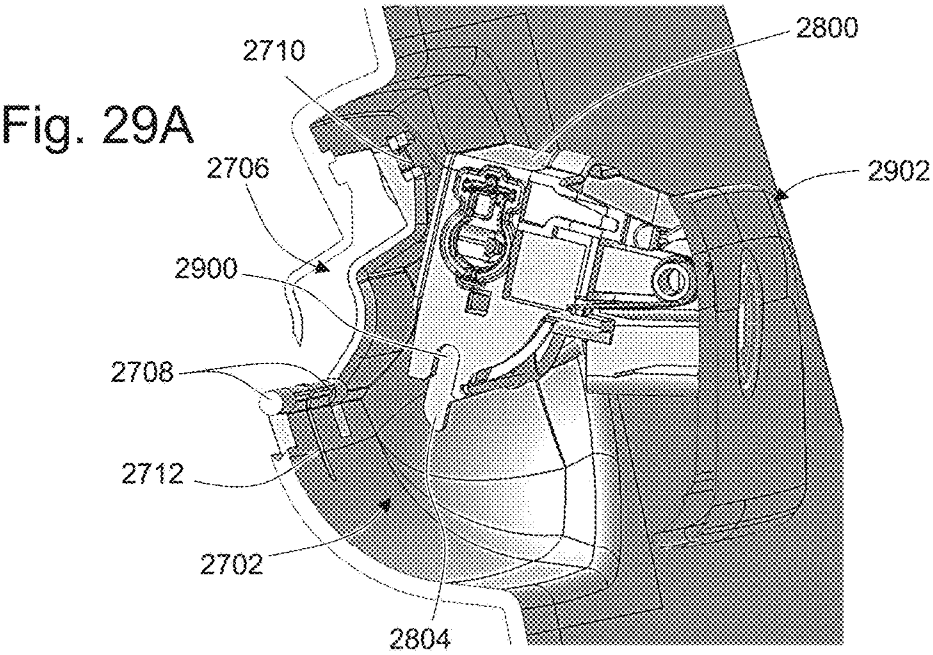
FIGS. 29A through 29C are cutaway views showing the assembly process of the latch assembly and door of FIGS. 27 and 28.
Figure 29B:
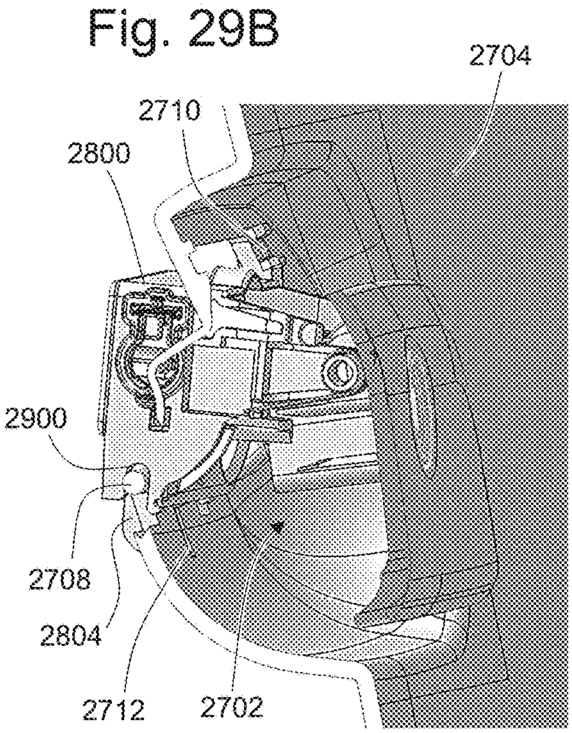
Figure 29C:
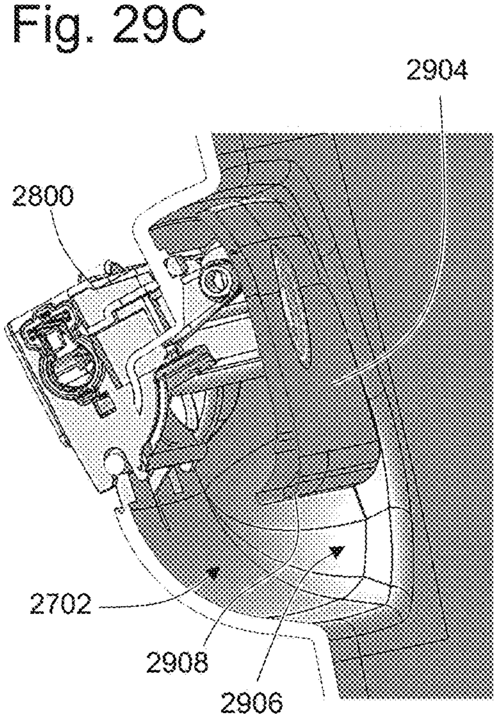

In this example, the parts may be assembled as shown in the progression illustrated in FIGS. 29A through 29C. Specifically, the latch base 2800, which may be assembled as part of a complete latch assembly 2902, may be moved into position to place the pivot slots 2900 over the pivots 2708 (FIG. 29B), and then rotated about the pivots 2708 to place the protrusion 2802 into the detents 2710 (FIG. 29C). The latch base 2800 is then secured to the door 2700 to prevent removal. The latch base 2800 may be secured to the door 2700 using one or more fasteners, such as screws or bolts, pins, retainer clips, or the like. The fasteners also may be in the form of snap fit hooks that extend from the latch base 2800 into the opening 2706 to catch on the lip of the opening 2706. Other alternatives and variations will be apparent to persons of ordinary skill in the art in view of the present disclosure.

When fully assembled, the latch assembly 2902 may have a paddle 2904 that lies generally flush with the surrounding outer surface 2704 of the door, with the recess 2702 forming an opening 2906 between a lip 2908 of the paddle 2904 and the outer surface 2704 to receive an operator's fingers. For aesthetic and operational reasons, it may be desirable for the remaining perimeter of the paddle 2904 (i.e., the portions other than the lip 2908) to be evenly spaced from the adjacent portions of the outer surface 2704. To this end, the opening 2706 and latch base 2800 also may include other features, such as corresponding registration features to help properly align and hold the parts. For example, the opening 2706 may include one or more slots 2712 and the latch base 2800 may include one or more corresponding ribs 2804 that fit snugly into the slots 2712 to provide a tight fit in the horizontal direction. In this example, the protrusions 2802 and detents 2710 also may provide a further registration feature that aligns the parts in the vertical direction. By making these particular parts of the door and the latch assembly with high tolerances, one can help assure that each latch assembly will properly fit with each door.

The foregoing embodiment of a connection system is expected to provide various benefits. For example, the latch 2904 can be quickly and easily assembled to the door 2700. Furthermore, if self-activating snap hooks or similar fasteners are used to hold the latch base 2800 in place, assembly can be performed from one side of the door 2700 in a single movement as shown in FIGS. 29A through 29C. This embodiment also can provide a tight fit, a low proportion of opening space that is not covered by the latch 2904, and other benefits as will be appreciated by persons skilled in the art.

Figure 30:
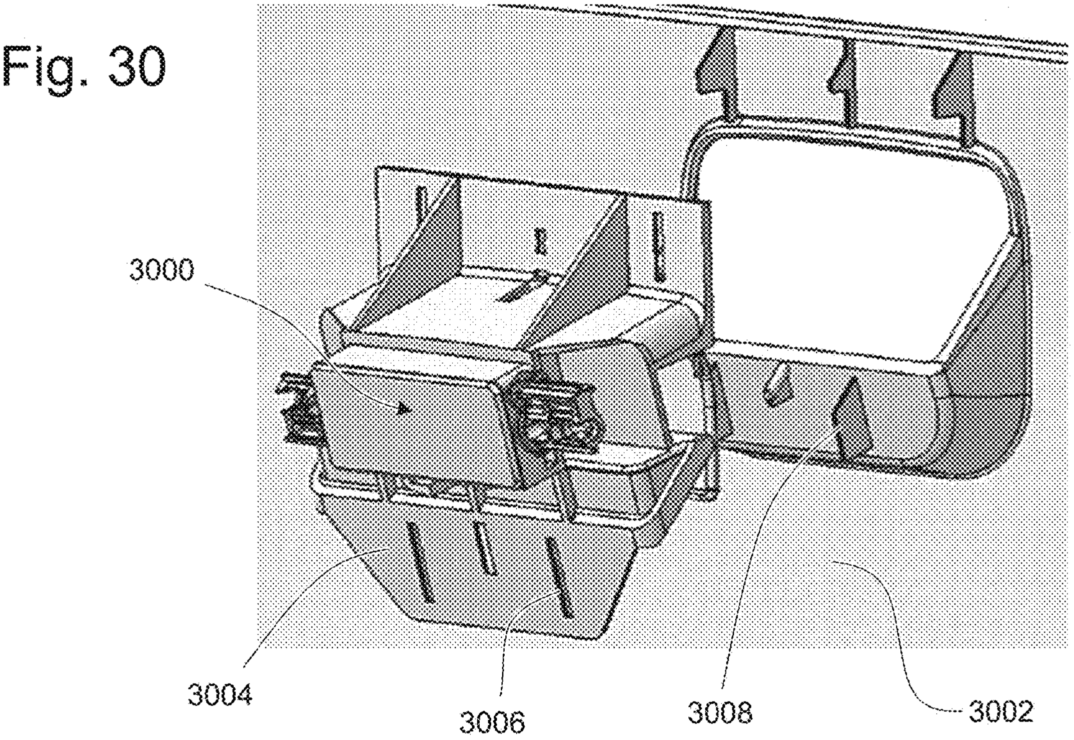
FIG. 30 is an exploded rear perspective view of another example of a latch assembly and door configuration.

FIG. 30 shows an alternative connection between a latch assembly 3000 and a door 3002. In this case, the latch assembly 3000 comprises or is connected to one or more peripheral flanges 3004 having one or more openings such as slots 3006. The door 3002 has protrusions, such as ribs 3008, that fit into the slots 3006 to hold the latch assembly 3000 in proper registration with the door 3002. The latch assembly 3000 may be assembled to the door 3002 by sliding the openings over the protrusions, then permanently deforming the protrusions to lock into the openings using a heat staking process or the like. Alternatively, other types of connector may be used, as known in the art.

Figure 31:
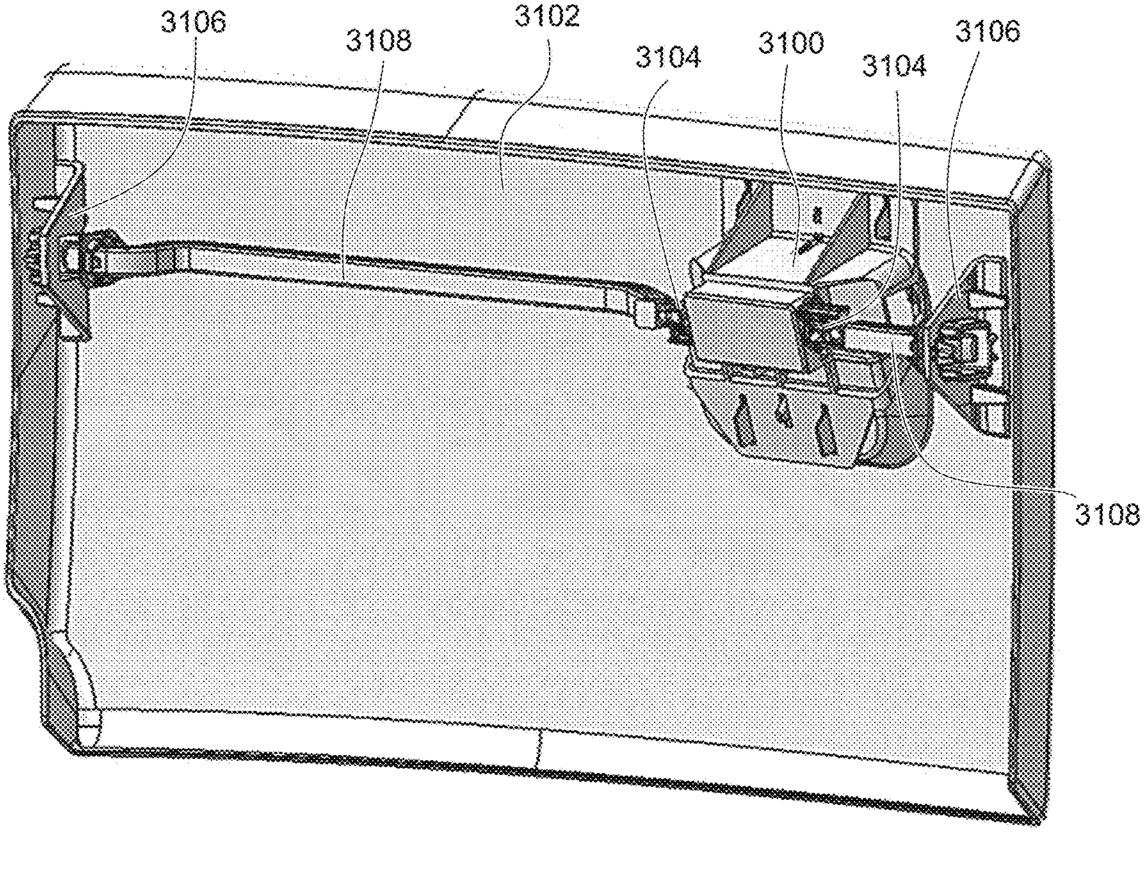
FIG. 31 is an assembled rear perspective view of the embodiment of FIG. 30, shown with additional exemplary features of the latch assembly.

FIG. 31 illustrates an example of how a latch assembly 3100 can be used to secure a door 3102 to a housing or the like. The latch assembly 3100 is rigidly connected to the door 3102 by any suitable connection, such as those described above or other types of connection. As with the other embodiments, the latch assembly 3100 includes one or more release members 3104 that move into and out of the latch assembly's base. The door 3102 is movable to be positioned next to a housing or frame having one or more strikers 3106. For example, the door 3102 may be connected to the housing by a hinge or a slider. For purposes of illustration, the body of the housing or frame is not illustrated, but the strikers 3104, which are rigidly connected as part of the housing, are shown in the positions they normally occupy. The strikers 3106 may comprise loops, pins, cups, openings, or other shapes that receive a corresponding pawl that is moved by the latch assembly 3100.

In some cases, the parts may be positioned and dimensioned such that the release member or members 3104 can reach directly into the striker(s) 3106. In these cases, the release members 3104 may be formed as pawls that engage the strikers 3016 to latch the door 3102 to the strikers 3106, and thus hold the door 3102 against the housing.

In other cases, such as shown in FIG. 31, one or more strikers 3106 may be remote from the associated one of the release members 3104, in which case a remote catch 3108 may be connected to the release member 3104 to span the distance from the release member 3104 to the respective striker 3106. The remote catches 3108 may be permanently or removably connected to the release members 3104, and such attachment may be by a rigid interface or a movable joint. The remote catches 3108 may pass through guides, such as rings or tubes integrated into the door 3102, to hold them in their proper position and to prevent them from flexing when an opening force is applied to the door 3100. Each remote catch 3108 may have a distal end formed as a wedge-shaped pawl 3206 (FIG. 32), or as any other shape that can selectively engage and disengage the associated striker 3106.

It is expected that the assembly configurations of FIGS. 27 through 30 will be beneficial to help provide a high degree of tolerance matching between latch assemblies and doors. In many situations, different companies manufacture different parts of a door assembly. One company makes the latch assembly, and another company makes the door panel, and a third company may assemble the latch assembly to the door panel. In such cases, it can be difficult to coordinate the manufacture of parts that assembled together with consistent quality of fit. The latch assembly configurations described above address this by providing registration features that, if properly made in a consistent manner, can result in a high degree of part interchangeability and final product quality.

Figure 32:
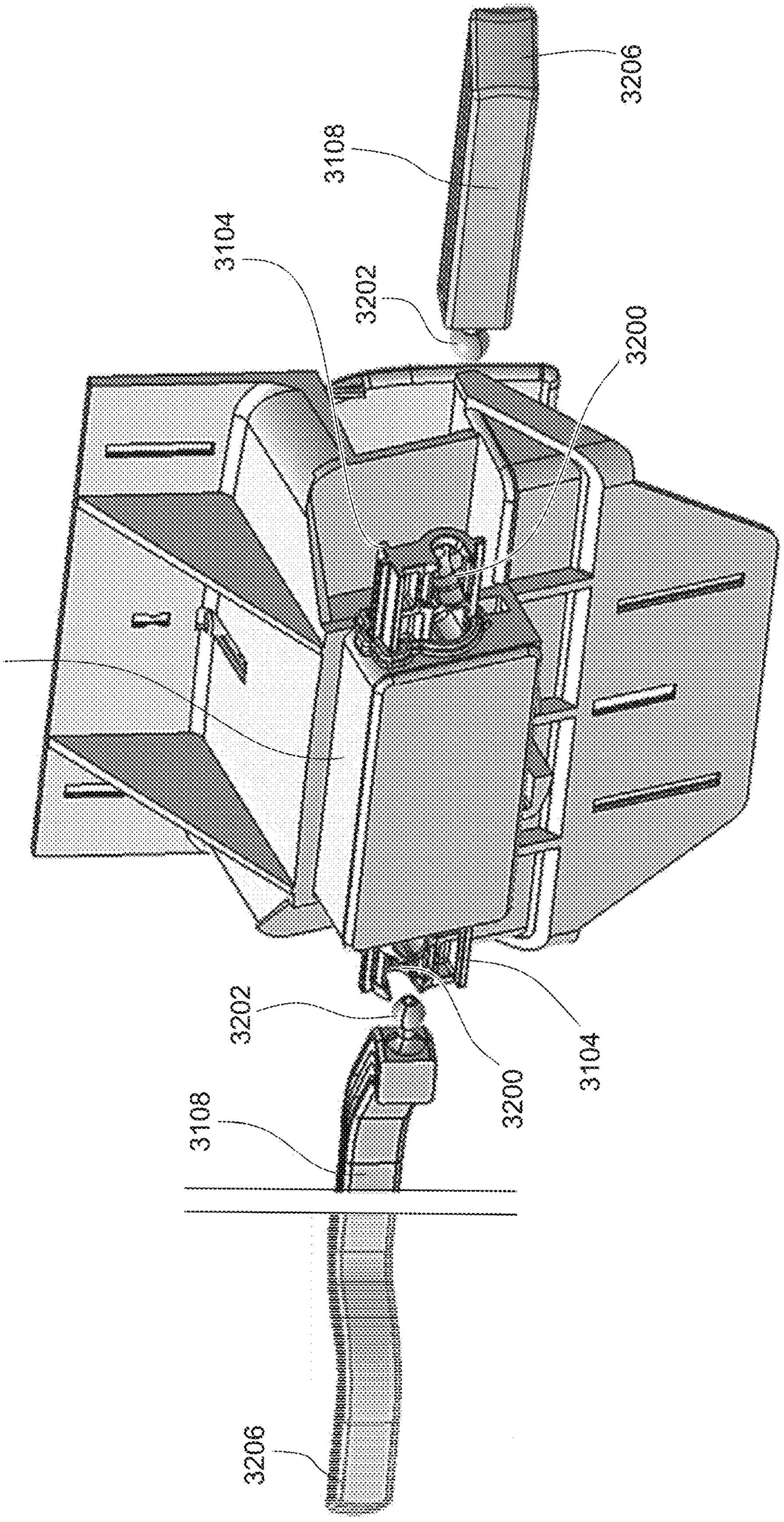
FIG. 32 is an exploded view of the embodiment of the latching assembled of FIG. 31.

FIG. 32 illustrates an example of how remote catches 3108 may be connected to the release members 3104. In this example, each release member 3104 has a catch receiver 3200, and each remote catch 3108 has a terminal 3202 that is configured to engage the respective catch receiver 3200. The terminal 3202 and receiver 3200 may have any suitable shape to provide a connection. In the shown example, the terminals 3202 are generally spherical balls, and the catch receivers 3200 have spherical sockets into which the terminals 3202 fit to provide a degree of angular rotation between the remote catches 3108 and the latch 3100. The spherical terminals 3202 may be snapped into the catch receivers 3200 by moving them through a slot located on the side of each catch receiver 3200. In other cases, a rigid connection, such as a threaded fitting or the like, may be used. In other cases alternative movable connections may be used. For example, the remote catches 3108 may be pinned to the catch receivers 3200. Other alternatives and variations will be apparent to persons of ordinary skill in the art in view of the present disclosure.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A latch assembly comprising:

a base;

a paddle rotatably connected to the base to pivot about a paddle axis, the paddle having a drive surface located at a position offset from the paddle axis, the drive surface being movable, upon rotation of the paddle about the paddle axis, through a first travel path extending between a first drive surface position and a second drive surface position; and a catch assembly connected to the base, the catch assembly having:

a catch pinion rotatably connected to the base to rotate about a pinion axis that is generally perpendicular to the paddle axis, the catch pinion comprising a pinion plate facing the paddle and having a concave recess to receive at least a portion of the drive surface when the drive surface moves between the first drive surface position and the second drive surface position, and an activation surface extending from the pinion plate at a location offset from the pinion axis, the activation surface being movable, upon rotation of the catch pinion about the pinion axis, through a second travel path extending between a first activation surface position adjacent the first drive surface position and a second activation surface position adjacent the second drive surface position, wherein the second travel path intersects the first travel path such that the drive surface can contact at least a portion of the activation surface throughout the first travel path;

at least one release member movably mounted to the base to move between a first release member position and a second release member position, wherein the catch pinion is operatively connected to the at least one release member to move the at least one release member from the first release member position to the second release member position upon rotation of the catch pinion from the first activation surface position to the second activation surface position;

wherein the catch pinion is operatively connected to the at least one release member by a drive gear rotationally fixed to the catch pinion and a rack gear fixed to the at least one release member with the rack gear in meshing engagement with the drive gear; and wherein the release member is slidingly mounted to the base such that rotation of the drive gear causes linear movement of the at least one release member.

2. The latch assembly of claim 1, further comprising a paddle return spring connected between the base and the paddle and configured to generate a restoring force to move the paddle towards the first drive surface position.

3. The latch assembly of claim 1, wherein the at least one release member comprises a first release member slidingly mounted to the base to move along a first sliding axis and a second release member slidingly mounted to the base to move along a second sliding axis.

4. The latch assembly of claim 3, further comprising a drive pinion rotationally fixed to the catch pinion, and wherein each of the first release member and the second release member comprises a respective surface held in engagement with the drive pinion such that rotation of the drive pinion causes the first release member and the second release member to slide relative to the base.

5. The latch assembly of claim 4, wherein the drive pinion comprises a gear, and the respective surfaces held in engagement with the drive pinion comprise respective gear racks in meshing engagement with the drive gear.

6. The latch assembly of claim 1, wherein the at least one release member comprises a catch rigidly fixed to the release member, and:

when the at least one release member is in the first release member position, the catch extends a first distance outside the base; and when the at least one release member is in the second release member position, the catch extends a second distance outside the base, the second distance being less than the first distance, or the catch does not extend outside the base.

7. A latch assembly comprising:

a base;

a paddle rotatably connected to the base to pivot about a paddle axis, the paddle having a drive surface located at a position offset from the paddle axis, the drive surface being movable, upon rotation of the paddle about the paddle axis, through a first travel path extending between a first drive surface position and a second drive surface position; and a catch assembly connected to the base, the catch assembly having:

a catch pinion rotatably connected to the base to rotate about a pinion axis that is generally perpendicular to the paddle axis, the catch pinion comprising a pinion plate facing the paddle and having a concave recess to receive at least a portion of the drive surface when the drive surface moves between the first drive surface position and the second drive surface position, and an activation surface extending from the pinion plate at a location offset from the pinion axis, the activation surface being movable, upon rotation of the catch pinion about the pinion axis, through a second travel path extending between a first activation surface position adjacent the first drive surface position and a second activation surface position adjacent the second drive surface position, wherein the second travel path intersects the first travel path such that the drive surface can contact at least a portion of the activation surface throughout the first travel path;

a lock movably mounted to the paddle and comprising a first lock surface that is selectively movable to a locking position at which the lock engages the catch pinion to prevent rotation of the catch pinion in at least one direction about the pinion axis; and wherein the pinion plate comprises a second lock surface that is located at the locking position when the catch pinion is in the first activation surface position.

8. A latch assembly comprising:

a base;

a paddle rotatably connected to the base to pivot about a paddle axis, the paddle having a drive surface located at a position offset from the paddle axis, the drive surface being movable through a first travel path when the paddle rotates about the paddle axis;

a catch pinion rotatably connected to the base to rotate about a pinion axis that is generally perpendicular to the paddle axis, the catch pinion including an activation surface positioned in the first travel path such that movement of the drive surface through the first travel path in at least one direction generates a force on the activation surface to rotate the catch pinion about the pinion axis;

a lock movably mounted to the paddle and comprising a first lock surface that is selectively movable to a locking position at which the lock engages the catch pinion to prevent rotation of the catch pinion in at least one direction about the pinion axis;

wherein the paddle is rotatable about the paddle axis between a first paddle position and a second paddle position;

wherein the first travel path extends between a first drive surface position when the paddle is in the first paddle position and a second drive surface position when the paddle is in the second paddle position;

wherein the latch locking position is located offset from the paddle axis;

wherein the catch pinion is rotatable about the pinion axis between a first pinion position and a second pinion position;

wherein the activation surface is at a first location offset from the pinion axis and is movable, upon rotation of the catch pinion from the first pinion position to the second pinion position, through a second travel path extending from a first activation surface position adjacent the first drive surface position to a second activation surface position adjacent the second drive surface position, wherein the second travel path intersects the first travel path such that the drive surface can contact at least a portion of the activation surface throughout the first travel path; and wherein the catch pinion further comprises a second lock surface at a second location offset from the pinion axis, the second lock surface being movable, upon rotation of the catch pinion from the first pinion position to the second pinion position, through a third travel path extending from a first lock surface position to a second lock surface position, wherein the latch locking position is located along the third travel path and adjacent the first lock surface position, and the first lock surface and the second lock surface are configured to prevent rotation of the catch pinion to the second pinion position when the first lock surface is located in the latch locking position.

9. The latch assembly of claim 8, wherein:

the latch locking position is offset from the first travel path in a direction parallel to the paddle axis; and the pinion axis is located, with respect to the paddle axis, between the latch locking position and the first travel path.

10. A latch assembly comprising:

a base;

a paddle rotatably connected to the base to pivot about a paddle axis between a first paddle position and a second paddle position;

a drive surface located at a position offset from the paddle axis, the drive surface being reconfigurable between a first configuration in which the drive surface is not movable relative to the paddle, and a second configuration in which the drive surface is movable relative to the paddle, and:

wherein, when the drive surface is in the first configuration, rotation of the paddle about the paddle axis from the first paddle position to the second paddle position forces the drive surface to move through a first travel path from a first drive surface position to a second drive surface position, and wherein, when the drive surface is in the second configuration, rotation of the paddle about the paddle axis does not force the drive surface to move through the first travel path from the first drive surface position to the second drive surface position; and a catch pinion rotatably connected to the base to rotate about a pinion axis that is generally perpendicular to the paddle axis, the catch pinion including an activation surface positioned in the first travel path at a location offset from the pinion axis, such that movement of the drive surface through the first travel path from the first drive surface position to the second drive surface position generates a force on the activation surface to rotate the catch pinion about the pinion axis from a first activation surface position to a second activation surface position;

wherein the drive surface is attached to a lever that is rotatably connected to the paddle about a lever pivot axis, the lever pivot axis being parallel to the paddle axis.

11. The latch assembly of claim 10, further comprising a first lock surface movably mounted to the paddle, the first lock surface being movable between an engaged position in which the first lock surface engages the lever to hold the drive surface in the first configuration, and a disengaged position in which the first lock surface does not engage the lever to hold the drive surface in the first configuration.

12. The latch assembly of claim 11, wherein the first lock surface is rotatably connected to the paddle to rotate between the engaged position and the disengaged position.

13. The latch assembly of claim 11, wherein the lever comprises a second lock surface located adjacent the first lock surface when the first lock surface is in the engaged position, and an opening located adjacent the first lock surface when the first lock surface is in the disengaged position.

14. The latch assembly of claim 10, wherein a second travel path intersects the first travel path such that the drive surface can contact at least a portion of the activation surface throughout the first travel path.

15. A latch assembly comprising:

a base;

a paddle rotatably connected to the base to pivot about a paddle axis, the paddle having a drive surface located at a position offset from the paddle axis, the drive surface being movable, upon rotation of the paddle about the paddle axis, through a first travel path extending between a first drive surface position and a second drive surface position; and a catch assembly connected to the base, the catch assembly having:

a catch pinion rotatably connected to the base to rotate about a pinion axis that is generally perpendicular to the paddle axis, the catch pinion comprising a pinion plate facing the paddle and having a concave recess to receive at least a portion of the drive surface when the drive surface moves between the first drive surface position and the second drive surface position, and an activation surface extending from the pinion plate at a location offset from the pinion axis, the activation surface being movable, upon rotation of the catch pinion about the pinion axis, through a second travel path extending between a first activation surface position adjacent the first drive surface position and a second activation surface position adjacent the second drive surface position, wherein the second travel path intersects the first travel path such that the drive surface can contact at least a portion of the activation surface throughout the first travel path; and wherein the paddle comprises a handle portion connected to the drive surface, wherein the handle portion is reconfigurable between a first configuration in which the handle portion moves freely relative to the drive surface, and a second configuration in which the handle portion moves together with the drive surface.

16. The latch assembly of claim 15, wherein, when the handle portion is in the first configuration, the handle portion is pivotable separately from the drive surface about the paddle axis.

* * * * *